US008504456B2

(12) United States Patent
Griffin et al.

(10) Patent No.: US 8,504,456 B2
(45) Date of Patent: Aug. 6, 2013

(54) BEHAVIORAL BASELINE SCORING AND RISK SCORING

(75) Inventors: Maura Louise Griffin, Atlanta, GA (US); Mary Palmer Harman, Darien, CT (US); Robert George Shiflet, Jr., Kennett Square, PA (US); Teresa Hegdahl Stigler, San Francisco, CA (US); David G. Turner, Wilmington, DE (US); Donna Dee Turner, Huntersville, NC (US)

(73) Assignee: Bank of America Corporation, Charlotte, NC (US)

( * ) Notice: Subject to any disclaimer, the term of this patent is extended or adjusted under 35 U.S.C. 154(b) by 204 days.

(21) Appl. No.: 12/916,226

(22) Filed: Oct. 29, 2010

(65) Prior Publication Data

US 2011/0131122 A1      Jun. 2, 2011

Related U.S. Application Data

(60) Provisional application No. 61/265,683, filed on Dec. 1, 2009.

(51) Int. Cl.
*G06Q 40/00* (2012.01)

(52) U.S. Cl.
USPC ............................................. 705/35

(58) Field of Classification Search
USPC ............................................. 705/35
See application file for complete search history.

(56) References Cited

U.S. PATENT DOCUMENTS

| | | | | |
|---|---|---|---|---|
| 6,658,393 | B1 * | 12/2003 | Basch et al. | 705/38 |
| 7,376,603 | B1 * | 5/2008 | Mayr et al. | 705/35 |
| 7,822,629 | B2 * | 10/2010 | Chen et al. | 705/7.29 |
| 8,082,207 | B2 * | 12/2011 | Bates et al. | 705/38 |
| 2003/0120586 | A1 | 6/2003 | Litty | |
| 2004/0153650 | A1 | 8/2004 | Hillmer | |
| 2004/0245330 | A1 | 12/2004 | Swift et al. | |
| 2005/0080701 | A1 | 4/2005 | Tunney et al. | |
| 2006/0116898 | A1 | 6/2006 | Peterson | |
| 2006/0282660 | A1 | 12/2006 | Varghese et al. | |

(Continued)

OTHER PUBLICATIONS

International Search Report and the Written Opinion of the International Searching Authority mailed Jan. 24, 2011 for International Application No. PCT/US 10/58380.

(Continued)

*Primary Examiner* — Eric T Wong
*Assistant Examiner* — Clifford Madamba
(74) *Attorney, Agent, or Firm* — Michael A. Springs; Moore & Van Allen PLLC; James C. Edwards

(57) ABSTRACT

Embodiments of the present invention relate to systems, apparatus, methods and computer program products for integrated risk management. More specifically, embodiments of the present invention provides for determining one or more activity baseline scores, each score associated with one or more activities and based at least in part on financial institution data from multiple financial institutions. The activity baseline score defines a normal risk or baseline activity for a customer, a customer segment or customer population. Further, the invention provides for monitoring at least the financial institution data to determine deviations from the activity baseline score(s) and generating and initiating communication of risk score alerts and/or activity baseline deviation alerts based on predetermined activity baseline deviations. Additional embodiments provide for determining a risk score based on risk patterns associated with financial institution data and, in some embodiments, non-financial institution data.

31 Claims, 9 Drawing Sheets

U.S. PATENT DOCUMENTS

| | | | |
|---|---|---|---|
| 2008/0077474 | A1 | 3/2008 | Dumas et al. |
| 2008/0103800 | A1 | 5/2008 | Domenikos et al. |
| 2008/0140576 | A1 | 6/2008 | Lewis et al. |
| 2008/0294541 | A1 | 11/2008 | Weinflash et al. |
| 2008/0319922 | A1 | 12/2008 | Lawrence et al. |
| 2009/0106846 | A1 | 4/2009 | Dupray et al. |
| 2009/0248560 | A1 | 10/2009 | Recce et al. |
| 2009/0248573 | A1 | 10/2009 | Haggerty et al. |

OTHER PUBLICATIONS

International Search Report and the Written Opinion of the International Searching Authority mailed Jan. 24, 2011 for International Application No. PCT/US 10/58403.

International Search Report and the Written Opinion of the International Searching Authority mailed Jan. 24, 2011 for International Application No. PCT/US 10/58414.

International Search Report and the Written Opinion of the International Searching Authority mailed Jan. 31, 2011 for International Application No. PCT/US 10/58409.

International Bureau of WIPO. PCT International Preliminary Report on Patentability and Written Opinion dated Jun. 5, 2012. PCT International Application No. PCT/US2010/058380. Name of Applicant: Bank of America Corporation. English Language. 9 pages.

International Bureau of WIPO. PCT International Preliminary Report on Patentability and Written Opinion dated Jun. 5, 2012. PCT International Application No. PCT/US2010/058403. Name of Applicant: Bank of America Corporation. English Language. 7 pages.

International Bureau of WIPO. PCT International Preliminary Report on Patentability and Written Opinion dated Jun. 5, 2012. PCT International Application No. PCT/US2010/058409. Name of Applicant: Bank of America Corporation. English Language. 10 pages.

International Bureau of WIPO. PCT International Preliminary Report on Patentability and Written Opinion dated Jun. 5, 2012. PCT International Application No. PCT/US2010/058414. Name of Applicant: Bank of America Corporation. English Language. 10 pages.

* cited by examiner

BEHAVIORAL BASELINE SCORING AND RISK SCORING

CLAIM OF PRIORITY UNDER 35 U.S.C. §119

The present Application for Patent claims priority to Provisional Application No. 61/265,683 entitled "Integrated Fraud and Customer Data Network" filed Dec. 1, 2009, and assigned to the assignee hereof and hereby expressly incorporated by reference herein.

FIELD

In general, embodiments of the invention relate to systems, methods and computer program products for risk assessment and management and, more particularly managing customers' or segments of customers' risk by determining one or more activity baseline scores and/or determining one or more risk scores.

BACKGROUND

Risk may be defined in a business environment as an event, situation or condition that may occur and if it occurs, will impact the ability of a business to achieve its desired objectives. Risk management involves (1) defining those events, situations or conditions and the potential impact to the business, customers and the like; (2) the ability to detect those defined events when they occur; (3) when detected, executing a pre-defined set of actions to minimize negative impacts based upon the level of threat and customer impact of mitigation alternatives (e.g., risk mitigation, prevention and the like); and (4) when unable to prevent a risk event from negatively impacting, executing a set of actions to recover all or part of the loss. In some cases, recovery includes supporting the legal process in criminal prosecution and civil actions.

In the financial world, risk management is necessary in various aspects of the business. Financial institutions manage various forms of risk. One such risk is credit risk, which is a risk related to the inability of a customer, client or other party to meet its repayment or delivery obligations under previously agreed upon terms and conditions. Credit risk can also arise from operational failures that result in an advance, commitment or investment of funds. Another financial risk is market risk, the risk that values of assets and liabilities or revenues will be adversely affected by changes in market conditions, such as market movements or interest rates. Additional forms of risk are financial unlawful acts, including fraud. Fraud involves the use of another person's or company's identity or financial accounts without their permission for the purpose of financial gain. Examples of fraud include identity theft, mass compromises, phishing, account takeover, counterfeit debit or credit cards, etc.

Financial institution fraud, otherwise referred to as bank fraud, is a term used to describe the use of fraudulent means to obtain money, assets, or other property owned or held by a financial institution and/or the financial institution's customers. While the specific elements of a particular banking fraud law vary between jurisdictions, the term "bank fraud" applies to actions that employ a scheme or artifice. For this reason, bank fraud is sometimes considered a white collar crime. Examples of bank fraud include, but are not limited to, check kiting, money-laundering, payment/credit-card fraud, and ancillary frauds such as identification theft, phishing and Internet fraud and the like.

In addition to bank fraud, other financial institution business activity may rise to the level of suspicious activity that may be associated with other unlawful activities. In this regard, the suspicious activity, if identified, may be instrumental in identifying perpetrators, the location of perpetrators or other information pertinent to unlawful activity, such as telephone numbers, Internet Protocol (IP) addresses and the like. These suspicious activities may include, but are not limited to, bank transactions, such as deposits, withdrawals, loan transactions and the like; credit card transactions; online banking activity such as compromised online banking IDs and the like; electronic commerce activity; call center activity and the like. Additionally suspicious activity may be determined from data related to computer security violators (i.e., hackers), fraudulent telephone calls, and entities associated with divisive computer programs (e.g., viruses, trojans, malware and the like) and the like.

In many instances, financial institutions have difficulty identifying ongoing bank fraud or other nefarious activities until the fraud has escalated to a level that has serious negative financial impact. Further, by the time a defrauded financial institution discovers the fraudulent activity, the perpetrator has oftentimes moved on to another financial institution. In some instances, in addition to moving on to a different financial institution, the perpetrator moves on to a different scheme using a different financial product. For example, if a particular perpetrator commits checking fraud against a savings bank, then the savings bank, upon discovering the fraud, will likely report the checking fraud to an organization that collects data on checking fraud. However, if the same perpetrator later attempts to commit credit-card fraud against a credit-card institution, the credit-card institution will be unaware of the perpetrator's previous act of checking fraud.

Risk assessments in the credit realm are undertaken to determine if a customer or a potential customer is credit-worthy, i.e., if credit should be extended or curtailed. Currently such risk or credit assessments are conducted by credit bureaus. However, credit bureaus are limited in the information that they have access to in making such assessments. Specifically, credit bureau information is limited to credit related information, such as extended credit lines, payment history, and the like. Absent from the credit bureau determination is other meaningful financial information, such as transactional information that assesses a customer's activities, for example, checking transactions, credit/debit card transactions, Automated Teller Machine (ATM) deposits/withdrawals, cash advances and the like. Also absent from the credit bureau determination are information regarding the assets the customer has, such as deposit and investment account balances and the like. In addition to assessing risk when credit is issued, a need exists to assess risks throughout the entire credit lifecycle including, but not necessarily limited to, credit distribution, repayment of credit and the like.

Therefore, from a credit risk assessment perspective, a need exists to develop a system that is not limited to assessing credit-worthiness based solely on credit information, and in some instances, additional account information. The desired system should provide for assessing a customer's activity in terms of their transaction data, across multiple financial institutions and multiple products within the financial institutions, as well as non-financial institution information, in order to obtain a comprehensive picture of a customer's transaction history, as well as historical activities, in order to accurately assess the customer's current activities. From a fraud risk perspective, a need exists to monitor and otherwise identify individuals or other entities that are likely to commit fraud across multiple financial products, across multiple channels and across multiple financial institutions, as well as to identify when customers are being victimized by dishonest individuals.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention relate to systems, apparatus, methods, and computer program products for risk management. Moreover, embodiments of the present invention provide for determining one or more customer or customer segment activity baseline scores, each score associated with one or more customer or customer segment activities and based at least in part on financial institution data from multiple financial institutions. The activity baseline score defines a normal activity or baseline activity for the customer or customer segment. Further, the invention provides for monitoring at least the financial institution data to determine deviations from the activity baseline score(s) and generating and initiating communication of risk alerts based on predetermined activity baseline deviations. In other embodiments of the invention customer or customer segment risk scores are determined that are associated with one or more risk patterns based on transaction data and/or asset and liability data, such as investment and loan data, respectively.

An apparatus for risk management defines embodiments of the present invention. The apparatus includes a computing platform including at least one processor and a memory. The apparatus further includes an activity baseline routine stored in the memory and executable by the processor. The activity baseline routine is configured to determine a customer activity baseline score associated with one or more customer activities and based on financial institution data received from a plurality of financial institutions. The term "score" may mean a quantifiable score or a model that determines baseline activities.

In other specific embodiments of the apparatus, the activity baseline routine is further configured to determine a customer segment activity baseline score associated with one or more segment activities. A customer segment is defined as a plurality of customers having at least one common activity or trait. In further related embodiments of the apparatus, the activity baseline routine is further configured to determine a customer population activity baseline score associated with one or more population activities. The customer population is defined as a totality of customers or clients. In still other specific embodiments the activity baseline routine is further configured to determine a counter-party activity baseline score associated with one or more counter party activities. A counter party is defined as other persons or entities (excluding the customer/client) involved in the transaction or interaction with one or more customers or clients.

In still further specific embodiments, the apparatus includes an activity baseline deviation routine stored in the memory, executable by the processor and configured to monitor for deviations from the customer activity baseline score. In such embodiments, the activity baseline deviation routine is further configured to monitor for positive and negative deviations from the customer activity baseline score. In further such embodiments, the activity baseline deviation routine is configured to monitor for the deviations by analysis of data received in a risk database, while in additional embodiments, the activity baseline deviation routine may be configured to monitor for the deviations by querying at least one of the plurality of financial institutions and/or one or more non-financial institutions. In other embodiments of the apparatus, the activity baseline deviation routine is configured to monitor for deviations by querying one or more non-financial institutions, separately or in combination, with querying financial institutions.

In other specific embodiments, the apparatus may include a risk alert routine stored in the memory, executable by the processor and configured to generate and initiate communication of an activity baseline deviation alert based on determination of a deviation from the customer activity baseline score. Further, the risk alert routine may be configured to generate and initiate the communication of a risk score alert. In such embodiments, the activity baseline deviation alert routine may be further configured to communicate the activity baseline deviation alert and/or risk score alert to predetermined entities based on a predetermined level of deviation and/or a predetermined type of deviation.

In other specific embodiments of the apparatus, the activity baseline routine is further configured to determine the customer activity baseline score based on non-financial institution data received from one or more non-financial institution entities, such as, but not limited to merchants/retailers, utilities (such as Telcos or ISPs), suppliers and the like.

In still further specific embodiments, the activity baseline routine is further configured to determine a plurality of customer activity baseline scores, wherein each customer activity baseline score is associated with different one or more customer activities. As such each customer may have multiple activity baseline scores such that each score is associated with one or more different activities, such as purchasing activity, deposit activity, investment activity, interaction activity or the like.

In another specific embodiment, the apparatus includes a third party query routine stored in the memory, executable by the processor and configured to receive third party activity baseline deviation queries. Third party activity baseline queries determine whether a customer activity or event is a deviation from the activity baseline score and communicate a query response to the third party. In a further embodiment the apparatus includes a customer identifying routine stored in the memory, executable by the processor and configured to positively identify the customer from the financial institution data prior to determining the activity baseline score.

A method for risk management provides for additional embodiments of the invention. The method includes determining, via a computing device processor, a customer activity baseline score associated with one or more customer activities and based on financial institution data received from a plurality of financial institution and, in some embodiments, non-financial institution data received from one or more non-financial institution entities. The method additional includes monitoring, via a computing device processor, the financial institution data for a deviation from the customer activity baseline score; and initiating, via a computing device processor, a risk management action based on determination of one or more deviations from the customer activity baseline score.

In specific embodiments of the method, determining further includes determining, via the computing device processor, a customer segment activity baseline score associated with one or more segment activities. A customer segment is defined as a plurality of customers having at least one common activity or trait. In such embodiments, monitoring further includes monitoring, via the computing device processor, the financial institution data for a deviation from the customer segment activity baseline score and initiating further includes initiating, via the computing device processor, a risk management action based on determination of one or more deviations from the customer segment activity baseline score.

In further specific embodiments of the method, determining further includes determining, via a computing device processor, a customer population activity baseline score associated with one or more segment activities. The customer population is defined as the totality of customers and/or the totality of clients. In such embodiments, monitoring further includes monitoring, via a computing device processor, the financial institution data for a deviation from the customer population activity baseline score and initiating further includes, via a computing device processor, a risk management action based on determination of one or more deviations from the customer population activity baseline score.

In still further specific embodiments of the method, determining includes determining, via a computing device processor, a counter-party activity baseline score associated with one or more counter-party activities. A counter party is defined as other persons or entities (excluding the customer) involved in a transaction or interaction with the customer or client. In such embodiments, monitoring further includes, via a computing device processor, the financial institution data for a deviation from the counter-party activity baseline score and initiating further includes initiating, via a computing device processor, a risk management action based on determination of one or more deviations from the counter party activity baseline score.

In still further specific embodiments of the method, monitoring further includes monitoring for positive and negative deviations from the customer activity baseline score. In still further specific embodiments, monitoring further includes analyzing data received in a risk database to determine the deviation from the customer activity baseline score. In still further embodiments of the method, monitoring further includes querying at least one of the plurality of financial institutions and/or non-financial institution entities to determine the deviation from the customer activity baseline score.

In still further specific embodiments of the method, initiating further includes generating and initiating communication, via computing device processor, of an activity baseline deviation alert based on determination of a deviation from the customer activity baseline score. In further embodiments of the method, initiating further includes generating and initiating communication, via a computing device processor, of a risk score alert. In such embodiments, the activity baseline deviation alert may be communicated to predetermined entities based on a predetermined level of deviation and/or may be communicated to predetermined entities based on one or more of a predetermined type of deviation.

In other specific embodiments the method includes receiving third party activity baseline deviation queries from a third party and determining whether a customer activity or event associated with the query is a deviation from the activity baseline score and communicating a query response to the third party. While in still further embodiments the method includes identifying a customer from the financial institution data prior to determining the customer's customer activity baseline score.

A computer program product that includes computer-readable medium defines further embodiments of the invention. The computer-readable medium includes a first set of codes for causing a computer to determine a customer activity baseline score associated with one or more customer activities and based on financial institution data received from a plurality of financial institution. Additionally, the computer-readable medium includes a second set of codes for causing a computer to monitor the financial institution data for a deviation from the customer activity baseline score. In addition, the computer-readable medium includes a third set of codes for causing a computer to initiate a risk management action based on determination of one or more deviations from the customer activity baseline score.

Another apparatus for risk assessment defines further embodiments of the invention. The apparatus includes a computing platform including at least one processor and a memory. The apparatus further includes a risk score routine stored in the memory and executable by the processor. The risk score routine is configured to determine a customer risk score associated with one or more risk types, such as credit risk, fraud and the like, and based on known/existing or emerging risk patterns associated with financial institution data, including at least one of customer transaction data or customer asset data, received from one or more financial institutions.

In further specific embodiments of the apparatus, the risk score routine is configured to determine a customer segment risk score associated with one or more risk types, such as credit risk, fraud and the like and based on known/existing or emerging risk patterns associated with financial institution data, including at least one of customer segment transaction data or customer segment asset data. A customer segment is defined as a plurality of customers having at least one common activity or trait. In other related embodiments of the apparatus, the risk score routine is further configured to determine a counter-party risk score associated with one or more risk types and based on known/existing and/or new/emerging risk patterns associated with financial institution data, including counter-party transaction data. A counter party is defined as other persons and/or entities (excluding the customer/client) involved in a transaction or interaction with one or more customers or clients.

In further specific embodiments of the apparatus the risk score routine is further configured to determine customer risk scores associated with one or more risk types based on known/existing and/or new/emerging risk patterns associated with at least one of negative file data, customer data, customer network data or non-financial institution data.

Another method for risk management provides for further embodiments of the invention. The method includes receiving, from one or more financial institutions, one or more risk patterns associated with financial institution data, including at least one of customer transaction data or customer asset data. The method further includes determining, via a computing device processor, a customer risk score associated with one or more risk types based on the one or more risk patterns within a customer's profile.

In specific embodiments of the method receiving further includes receiving, from one or more financial institutions, one or more risk patterns associated with financial institution data, including at least one of customer segment transaction data or customer segment asset data and determining further includes determining, via the computing device processor, a customer segment risk score associated with one or more risk types and based on the one or more risk patterns. A customer segment is defined as a plurality of customers having at least one common activity or trait. In further embodiments of the method, receiving further includes receiving, from one or more financial institutions, one or more risk patterns associated with financial institution data, including counter-party transaction data and determining further includes determining, via the computing device processor, a counter-party risk score associated with one or more risk types and based on the one or more risk patterns. A counter party is defined as other persons and/or entities (excluding the customer) involved in a transaction or interaction with the customer or client.

In further specific embodiments of the method, receiving further includes receiving, from one or more financial institutions, the one or more risk patterns associated with at least one of negative file data, customer data or customer network data. In still further embodiments the method includes receiving, from one or more non-financial institution entities, risk patterns associated with non-financial institution data and determining further includes determining, via the computing device processor, the customer risk score associated with one or more risk types based on the plurality of risk patterns associated with financial institution data and the plurality of risk patterns associated with non-financial institution data.

Another computer program product including a computer-readable medium defines further embodiments of the invention. The computer-readable medium includes a first set of codes for causing a computer to receive one or more risk patterns associated with financial institution data, including at least one of customer transaction data or customer asset data and a second set of codes for causing a computer to determine a customer risk score associated with one or more customer activities based on the one or more risk patterns.

Thus, further details are provided below for systems, apparatus, methods and computer program products for assessing risk based on determination of one or more activity baseline scores for a customer or a segment of customers, each score associated with one or more customer activities or segment of customer activities. Additional embodiments provide for monitoring for deviations from the activity baseline score and communicating alerts based on the deviations. As such the present invention provides determining positive and negative deviations from normal risk levels across multiple different customer activities, such as customer characteristics, traits or the like. In additional embodiments systems, methods and computer programs are provided for determining a risk score for a customer, segment or counter party based on risk patterns associated with financial institution data and, in some embodiments non-financial institution data, transactional data and asset data To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Reference will now be made to the accompanying drawings, which are not necessarily drawn to scale, and wherein.

DETAILED DESCRIPTION OF EMBODIMENTS OF THE INVENTION

Figure 1:
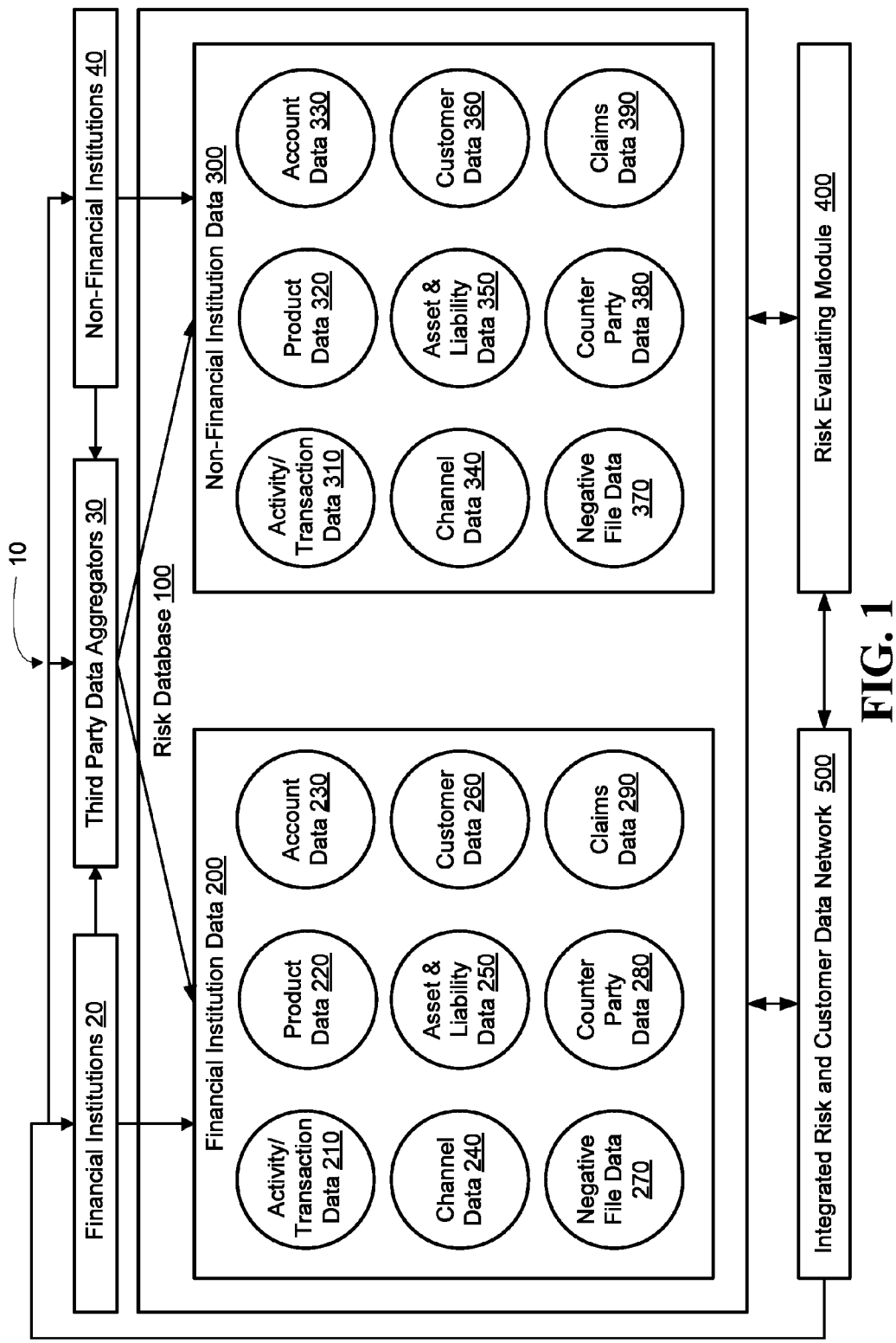
FIG. 1 is a block diagram of a system for collecting customers' personal and financial data across multiple financial products and channels from multiple financial institutions and non-financial institutions for the purpose of leveraging the collected data to manage risk, in accordance with an embodiment of the present invention.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident, however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments of the present invention, the functions described may be implemented in hardware, software, firmware, or any combination thereof. If implemented in software, the functions may be stored or transmitted as one or more instructions or code on a computer-readable medium. Computer-readable media includes both computer storage media and communication media, including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

In general, embodiments of the present invention relate to systems, methods and computer program products for collecting customers' financial data from multiple financial institutions, from multiple different communication channels, and across multiple financial products/services within the financial institutions. The collected data includes transactional level data, such as checking transactions, ATM transactions, and credit/debit card transactions that allow for determination of a customer's transactional activities. Additionally, the financial institution data includes account data, such as balances and the like, and customer data, such as personal data, demographics data and the like. In addition, customer related data may be collected from non-financial institutions, such as retailers (online and brick & mortar) government agencies, Internet Service Providers (ISPs), telephone companies (Telcos), health care industry entities, and the like. The non-financial information may provide for additional transactional information, such as the type of items purchased and the like, activity data, such as purchasing or browsing activities, and customer data.

For the purposes of this invention, a "financial institution" is defined as any organization in the business of moving, investing, or lending money, dealing in financial instruments, or providing financial services. This includes commercial banks, thrifts, federal and state savings banks, savings and loan associations, credit unions, investment companies, insurance companies and the like. A "customer" is defined as an individual or entity having an account or relationship with entities implementing the risk management system, and/or an individual or entity having an account or relationship with a financial institution or a non-financial institution supplying data to the entity implementing the risk management system of the present invention. A "counterparty" is defined as other individuals or entities (excluding the customer) involved in a transaction. A "transaction" can be monetary in nature (e.g., a purchase via a credit card; depositing a check in an account; a stock trade or the like) or non-monetary in nature (e.g., a telephone call; an encounter with a financial institution or non-financial institution associate/representative; an identity authentication process, such as a biometric identity authentication process; recorded use of a utility, such as electricity and the like).

The collected customer data is captured in a comprehensive centralized risk database that allows for analytics and/or logic to be performed on the data for the purpose of leveraging the collected data to determine the customer's activities and/or the customer's likely activities to thereby reduce risk.

In addition, according to specific embodiments, the comprehensive centralized risk database includes negative activity data that identifies the individuals or entities, including their demographics, transactions, products/accounts and the like, involved in fraud, and other risky activities that can lead to financial loss. For fraud, examples of negative activity data elements include, but are not limited to, the names of fraud perpetrators; information associated with the perpetrators (e.g., aliases, addresses, telephone numbers, IP addresses and the like); information related to fraudulent and other activity across multiple industry products/services; identification of activities at the account and transaction level across both industry-related activities and non-industry related activities; and the like. Thus, the negative activity data is received from financial institutions and, in some embodiments of the invention, from non-financial institutions.

Further, embodiments of the invention leverage the collected data and the negative activity database for use in analytical analysis that provides a holistic view of each customer's financial activity in order to manage and reduce risk.

In specific embodiments of the invention, the collected data is used to determine, for customers, customer segments, counterparties, etc., an activity baseline score that provides a holistic assessment of the customer's/customer segment's/counterparty's baseline, or normal financial activity, for example, how and where a customer, customer segment or counterparty normally transacts, channels used, transaction amounts, average deposits maintained and the like. Once an activity baseline score has been determined, the score(s) may be communicated to designated parties. In addition, once an activity baseline score has been determined, continuous monitoring of the customer's/customer segment's/counterparty's collected data provides for determination of deviations from the baseline. Deviations from the baseline can be both positive and negative deviations, negative deviations indicating potentially risk inducing activity and positive deviations indicating potentially risk reducing activities. In other embodiments, the activity baseline score may indicate that the customer/customer segment/counterparty exhibits risky activity at their normal level, posing a constant or consistent risk, such as a credit risk, fraud risk or the like, even absent a deviation. In such instances, notifications and/or alerts may be communicated to designated parties based on abnormal deviations from the population baseline.

Embodiments of the present invention provide the collected data, as well as the activity baseline and risk scores, to financial institutions and/or non-financial institutions as a risk assessment tool that can be used alone or as an input into their own risk management systems. Examples where financial and non-financial institutions may use the collected data or the baseline or risk scores include, but are not limited to, determining whether to authenticate a transaction involving a particular account or customer, determining whether to issue credit to a particular customer, determining whether to open an account, and/or determining whether to conduct or expand business with a customer.

Additional embodiments of the invention provide for determining risk patterns and, in particular, new types of fraud or other new types of risk using the financial institution data, the non-financial institution data, the claims data, deviations from customer baselines and the negative file (e.g., risk activity and interactions) database to identify activities and patterns that are associated with loss due to risk. In related embodiments, the occurrences of risk patterns are monitored to provide for a health of industry risk indicator, such as a risk health score or the like, which indicates how well an entity, such as a company, an industry or a segment of the industry, is managing risk.

In addition, embodiments of the present invention provide for determining a risk score for customers, customer segments, customer populations, counterparties and the like that is associated with one or more risk types and is based on risk patterns and the combination(s), severity and frequency of risk patterns in a customer, customer segment, population, or counterparty's activities, transactions and networks as identified by using financial institution transactional data, claims data, and asset and liability data. In other embodiments, the risk score determination may take into account non-financial institution data, negative file data and the customer's/customer segment's/counterparty's network for any known high risk indicators. The risk score serves to predict the likelihood that doing business with a customer/segment/population or counterparty will result in loss due to risk.

Other embodiments of the invention provide for suspicious activity monitoring that leverages the use of the customer and transactional data across multiple financial institutions, multiple products/services within the financial institution and multiple financial institution channels. As such, the suspicious activity monitoring of the present invention includes account data, such as account opening and closing data; asset data, such as deposits and security investments; liability data, such as credit outstanding, payment status, credit limits and the like; biometric information and other activity indicators to detect identity compromise.

Further, embodiments of the present invention provide the collected data to data-analytics providers, such as third-party data-analytics providers, so that the data-analytics providers can use the collected data when constructing models that model customers' activity and when developing risk prevention and risk mitigation systems. The third-party data-analytics providers may develop and/or operate the activity baseline scoring, risk scoring, risk pattern and suspicious activity analytic models/services. It should be appreciated that a customer can be any individual or business, or non-business entity.

Also, for example, embodiments of the present invention authenticate whether an individual is who they say they are. As embodiments of the present invention gather financial transactions, demographic, retailer, computing device identification, Telco, biometric data in a single location, embodiments can provide for executing routines that authenticate an individual's identity—whether in-person or via phone or online/mobile. Accordingly, embodiments of the present invention provide a service whereby subscribers can use the service to authenticate individuals' identities. The service relies on knowing the customer's activities and other identifying characteristics about the customer based on information provided by financial institutions and non-financial institutions in combination with information provided by the entity implementing the risk management system, such as customer identifying information, e.g., social security number, taxpayer identification number, Global Positioning System (GPS), biometrics and the like and/or customer demographic information.

Referring to FIG. 1 a block diagram is depicted of a system 10 for aggregating and integrating risk-related data, in accordance with embodiments of the present invention. The system 10 includes a comprehensive centralized risk database 100, which is configured to collect or otherwise receive data across multiple financial products and multiple channels from multiple financial institutions for the purpose of managing risk related to credit, fraud and the like, in accordance with an embodiment of the invention. The system 10 includes a risk-evaluating module 400 that is configured to monitor or otherwise provide risk analysis on transaction data or other data received from various data repositories or databases associated with financial institutions, third-party data aggregators, and/or non-financial institutions. The risk-evaluating module 400 may be implemented by the risk management entity, such as a financial institution or a data aggregator, in alternate embodiments, the risk-evaluating module 400 may be implemented by one or more third-party entities (i.e., procured risk modeling).

The data in the risk database 100 may be communicated from and to financial institutions 20, third-party data aggregators 30 and/or non-financial institutions via integrated risk and customer data network 500. In addition, financial institutions 20, third-party data aggregators 40 and/or non-financial institutions may access integrated risk and customer data network 500 to implement the functionality of risk-evaluating module 400.

According to the illustrated embodiment, the centralized risk database 100 stores financial institution data 200. In additional embodiments, the centralized risk database 100 stores non-financial institution data 300. When evaluating customer risk and/or validating customer risk, the risk-evaluating module 400 receives and analyzes any and/or all financial institution data 200, and non-financial institution data 300. The data 200 and 300 will now be discussed in more detail.

According to some embodiments, customers' personal and financial data is provided to the system 10 by financial institutions 20, such as banks, credit-card companies, security investment companies and the like that hold a customer's checking, credit-card, and security investment accounts, and that have established financial relationships with the individual customers. It should be noted that unlike credit bureaus, which limit their inventory to liabilities, the risk database 100, and in particular financial institution data 200, of the present invention includes customer assets, as well as liabilities. The data received from multiple financial institutions is aggregated and stored as financial institution data 200, which is in electronic communication with the risk-evaluating module 400.

It should be noted that the various categories of data shown and described in relation to financial institution data 200 and non-financial institution data 300 may provide for overlap. For example, activity/transaction data 210 may include product data 220 or channel data 240 or the like.

The financial institution data 200 may include, but is not limited to, activity/transaction data 210. According to some embodiments, activity/transaction data 210 includes data related to financial institution transactions, both inflow transactions (e.g., deposits) and outflow transactions (e.g., withdrawals) such as savings/checking account transactions; Automated Clearing House (ACH) transactions; debit card transactions; credit card transactions; mortgage loan transactions; other loan transactions, such as home equity loan transactions; investment transactions (e.g., sale or purchase of an investment vehicle) and the like.

The activity/transaction data 210 also includes, according to some embodiments, credit card/debit card transaction data that includes data related to credit card or debit card purchases and payments, including date/time of purchases and store names and locations of where the purchases took place. In some embodiments of the invention, transaction data includes pre-purchase authorization requests that may be processed in advance of a payment transaction for certain types of purchases, such as, but not limited to, hotel and pay-at-the-pump gas debit card and credit card transactions.

Additionally, the activity/transaction data 210 includes, for example, online-banking data that includes transaction data related to any online service, including but not limited to, bill pay transactions, electronic/online security trades, mobile transactions and the like. The online banking data may additionally include indications as to how often and when an online account is accessed, indications of erroneous attempts at accessing an online account, indications of simultaneous duplicate requests to access an online account and any other means of compromising the online banking account.

Activity data may include any other data captured by the financial institution related to a customer activity. For example, activity data may be associated with a financial institution interaction that may not have risen to the transaction level, such as initiating but not completing an online transaction, an e-commerce transaction, an ATM transaction or a call center transaction or the like. In addition, activity data may include statistical data surrounding transactions. For example, the frequency and times customers make calls to call centers, ATM transactions, e-commerce transactions, online transactions and the like. For the purposes of this invention, transaction data is defined to include activity data.

In addition, activity/transaction data 210 includes e-commerce data that includes transaction data related to purchases of products or services made electronically, such as via a financial institution website or the like.

The financial institution data 200 may also include product data 220 that indicates the financial institution product associated with the customer activity and/or customer transaction. Financial institution products may include, but are not limited to, a checking account, a savings account, a debit card/account, a credit card/account, an investment product/account or the like. As previously noted, part or all of the product data 220 may be included in the activity/transaction data 210 or the risk database may be configured to implement a separate file for the product data 220.

The financial institution data 200 may also include account data 230 that indicates the customer's financial institution account associated with the customer's activity/transaction. Financial institution accounts may include, but are not limited to, checking accounts, savings accounts, credit card accounts, debit card accounts, credit accounts, loan accounts, investment accounts and the like. Account data 230 may additionally include account/status data, such as open, new, closed, suspended, balances, unavailable funds/account gone to loss, freezes, investment account balances, loan credit outstanding, credit limits, and the like.

As previously noted, part or all of the account data 230 may be included in the activity/transaction data 210 and/or product data 220 or the risk database may be configured to implement a separate file for the account data 230.

In addition, the financial institution data 200 may also include channel data 240 that indicates the source of the customer activity/transaction. Financial institution channels may include, but are not limited to, the financial institution retail outlet, electronically (e.g., direct deposit or bill pay), online/mobile or via a call center, or that a transaction occurred at a retail location, online or by phone. As previously noted, part or all of the channel data 240 may be included in the activity/transaction data 210 or the risk database may be configured to implement a separate file for the channel data 240. Additionally, the channel data 240 may include call center data that may include transaction data from a plurality of call centers across a plurality of financial institutions. Also, the channel data 240 may include ATM data that includes transaction data from a plurality of ATMs across a plurality of financial institutions. The ATM data may include the frequency and times customers use ATMs, as well as the nature of the ATM transaction.

Moreover, the financial institution data 200 may include asset and liability data 250. The asset data may include, but is not limited to, deposit and investment status information; investment and deposit balances, investment values, equity value of real estate, indications of liquidity (e.g., CD maturity dates) and the like. The liability data may include credit outstanding, credit limits, payment status data, payoff dates and the like.

In addition, the financial institution data 200 may include customer data 260 that indicates personal data, demographics data and any other customer data associated with accounts or products. Customer data 260 may additionally include scores derived from the data in the risk database 100, such as activity baseline and risk scores and the like. It may also include any risk indicators from data collected in the account data 230 or negative file data 270 regarding a customer or their related information (e.g., number of account gone to loss events over a time period, bad address, and the like). As previously noted, part or all of the customer data 260 may be included in the activity/transaction data 210, account data 230 and/or asset and liability data 250, or the risk database may be configured to implement a separate file for the customer data 260.

Further, according to specific embodiments, the financial institution data 200 may include negative file data 270 which includes identifying data related to historical/known risk activities. In specific embodiments, the financial institution negative file data 270 may be financial industry-wide negative file data or the like. Thus, the negative file data 270 may be received from multiple financial institutions 20 or from third-party data aggregators 30. It should be noted that in specific embodiments negative file data 270 may be received from entities that are not otherwise contributors to the risk database 100. Additionally, negative file data 270 includes, but is not limited to, fraudulent or other risk activity related to multiple products and/or services and multiple channels for delivering the products/services.

The negative file data 270 provides for multiple financial institutions and in some specific embodiments of the invention, all financial institutions, and in some embodiments, non-financial institutions to access the negative file data 270 for purposes of determining historical risk activities and information related to the activities. In some embodiments of the invention, the negative file is used to determine the accuracy of information provided to the entity by a customer. The negative file data 270 may subsequently be used to determine risk patterns, monitor suspicious activity and/or other risk related activities. The negative file data 270 may include, but is not limited to, the name(s) of the high risk individuals and entities, addresses, telephone numbers, social security numbers, IP addresses, device identifiers/prints, such as Subscriber Identity Module (SIM) number or the like, biometric data, such as fingerprint data, voice data or the like, associated with the perpetrators and the like. The negative file may also indicate if these data elements belong or are associated with the perpetrator(s), or have been illegitimately used by the perpetrator(s). Additionally, negative file data 270 may include suspicious account data, otherwise referred to as compromised-account data, which includes counterfeited accounts, data related to computer security violators (i.e., hackers) or the like. Additionally, according to some embodiments, the suspicious-account data includes data related to fraudulent telephone calls and/or a counter-fraud intelligence platform that provides information related to viruses, trojans, malware and the like.

The negative file data 270 may, in specific embodiments, include mined data obtained from financial institutions that is used to identify suspicious activity or items, such as accounts, applications or the like, linked to elements within the negative file data 270. Once the linked items have been identified, the financial institutions or non-financial institutions may be electronically notified or otherwise alerted. For example, if an existing customer's phone number has been used in a fraud scam, the financial institutions that have the customer and phone number on record in the risk database 100 would receive an alert that the phone number had been used fraudulently.

The financial institution data 200 may additionally include counterparty data 280. A "counterparty" is defined herein as the parties involved in a transaction with the customer. Counterparty data 280 may include, but is not limited to, data related to customer transactions that is specific to the counterparty and is not typically reported to the financial institution, such as items/services provided in the transaction and the like. Additionally, counterparty data 280 includes identifying characteristics of the counterparties such as name, location, merchant number, parent company and the like. In some embodiments, this file contains the list of payment processors and the merchants they service. Additionally, in some embodiments, the counterparty data 280 is augmented with data regarding the counterparty that can be obtained from the customer data 260 and/or 360 as well as claims data 290 and/or 390. In other instances, the customer data 260, 360 or the claims data 290, 390 may be augmented with data regarding the counterparty from the counterparty data 380. Additionally, counterparty data 280 may include overall statistics associated with the counterparty that are relevant to risk determination.

The financial institution data 200 may also include claims data 290 that includes fraud and non-fraud claims made by the customer or the counterparty. The claims data 290 is across multiple financial institution products, multiple financial institution channels and multiple different financial institutions. The claims data 290 may be implemented in conjunction with activity/transaction data 210 for risk detection, such as mass compromises, merchant customers whose profitability is compromised by high claim rates or the like.

According to some embodiments, third-party data aggregators 30 may provide data to the risk database 100. Third-party data aggregators 30 are organizations that collect data from multiple institutions, both financial institutions and non-financial institutions, and then organize and resell the collected data. The data aggregator data may, in some embodiments, be used to supplement data provided by financial institutions as a means of further understanding the customer and the customer's activities. The data provided by third-party data aggregators 30 may, according to specific embodiments, be collected, tagged or otherwise identified within the risk database 100 based on the data aggregator source and stored with associated customer data, associated account data and/or in one or more distinct data aggregator files. Data aggregators are often used as an efficient means of collecting data. In other embodiments of the invention, data aggregators may be used for the value-added insights or analytics provided. This modeled data can be used in addition to data collected by financial institutions and non-financial institutions (e.g., credit bureau data including FICO scores, commercial segmentation scores) or to fill gaps possibly caused by lack of participation by one or more financial or non-financial institutions (e.g., customer segmentation and marketing data on investible assets).

According to some embodiments, the third-party data aggregators 30 are Consumer Reporting Agencies ("CRAs"), otherwise referred to as credit reporting agencies, or the like. Typically, CRAs collect personal and liability information about individual consumers, generate credit reports to indicate the creditworthiness of individual consumers, and offer these credit reports to prospective creditors. More specifically, CRAs collect personal and financial information about individual consumers from a variety of sources called data furnishers. These data furnishers are typically institutions that have had financial relationships with individual consumers. For example, data furnishers may be creditors, lenders, utility companies, debt collection agencies, government agencies, and courts. Data furnishers report data regarding individual consumers to CRAs, and, based on the received data, CRAs generate a credit report for each individual consumer. A typical credit report contains detailed information about an individual consumer's credit history, including credit accounts and loans, and recent inquiries. These credit reports also contain a credit score, which is a measure of credit risk calculated using the information provided in the credit report.

According to some embodiments, non-financial institutions 40, such as merchants, retailers, utility companies, social networks, government agencies and the like provide non-financial institution data 300 to the risk database 100. The data received from non-financial institutions 40 may, in some embodiments, be collected and stored as non-financial institution data 300, which is distinct from the financial institution data 200, is in electronic communication with the risk-evaluating module 400. The non-financial institution data 300 further includes customer identification data and provides insight into customer activities and interactions.

In some embodiments, non-financial institution data 300 includes activity/transaction data 310. According to some embodiments, activity/transaction data 310 includes data related to financial transactions, such as non-financial institution credit account transactions; Point-Of-Sale (POS) transactions and the like. The data may include, but is not limited to, details of the purchase (e.g., amount of electricity consumed, detailed POS receipt listing items purchased and the like), date/time of purchases/usages and seller's names and locations of where the purchases took place.

Additionally, the activity/transaction data 310 includes, for example, online-non-financial data that includes transaction data related to any online transactions and the like.

In addition, activity/transaction data 310 includes e-commerce data that includes transaction data related to purchases of products or services made electronically, such as via a merchant website or the like. In addition, activity/transaction data 310 may include activity data. In this regard, retailers, in particular, online retailers, search engines or the like, collect and may provide purchase activity and browsing data, which may include browsing data related to purchases or interaction with the online site. In addition, telephone companies may provide transaction in the form of telephone call data, e.g., to whom calls were made, from whom calls were received, length of calls, location-determining data, calling patterns and the like. Data from Telcos and, alternatively Post Offices enable verification of active and/or credible telephone numbers and/or addresses.

Internet Service Providers (ISPs), search engines and social networks may provide activity/transaction data 310, in the form of browsing history, contact/friend lists, email activity, purchase transaction data, including applications purchased and/or used, download data and the like. Additionally, activity/transaction data 310 may include health care industry data, such as, but not limited to, health care records, Medicaid claims, and the like.

The non-financial institution data 300 may also include product data 320 that indicates the non-financial product associated with the customer activity and/or customer transaction. Non-financial institution products may include, but are not limited to, email service, wireline phone service, electricity, home improvement products, online books or the like. As previously noted, part or all of the product data 320 may be included in the activity/transaction data 310 or the risk database may be configured to implement a separate file for the product data 320. The non-financial institution data 300 may also include account data 330 that indicates the customer's non-financial institution account associated with the customer's activity/transaction. Non-financial institution accounts may include, but are not limited to, a specific telephone number, an email address, a subscription, a grocery membership/rewards card, layaway account or the like. In some instances, the non-financial institution accounts may be financial accounts, such as a merchant credit card account or the like. In specific embodiments of the invention, the account data file includes account status, such as: open, new, closed, suspended, balance, limit and the like. As previously noted, part or all of the account data 330 may be included in the activity/transaction data 310, the product data 320, or the risk database may be configured to implement a separate file for the account data 330.

In addition, the non-financial institution data 300 may also include channel data 340 that indicates the source of the customer activity/transaction. Non-financial institution channels may include, but are not limited to, the non-financial institution retail outlet, online/mobile or via a call center. As previously noted, part or all of the channel data 340 may be included in the activity/transaction data 310 or the risk database may be configured to implement a separate file for the channel data 340.

Moreover, the non-financial institution data 300 may include asset and liability data 350. The asset data may include, but is not limited to, deposit balances, credit balances on accounts, devices owned (e.g., cellular telephone(s)) and the like. The liability data may include credit outstanding, credit limits, payment status data, layaway balances, claims and the like.

In addition, the non-financial institution data 300 may include customer data 360 that indicates customer name, personal data, demographics data and any other customer data associated with accounts or products. Customer data 360 may additionally include scores derived from the data in the risk database 100, such as baseline and risk scores and the like. It may also include any risk indicators from data collected in the account data 230, 330 or negative file data 270, 370 regarding a customer or their associated information (e.g., late payment data, bad addresses or the like).

Further, according to specific embodiments, the non-financial institution data 300 may include negative file data 370 which includes identifying data related to historical/known fraud, or other high risk activities. In specific embodiments, the non-financial institution negative file data 370 may be multi-industry negative file data or the like. Thus, the negative file data 370 may be received from multiple non-financial institutions 40 or from third-party data aggregators 30. It should be noted that in specific embodiments, negative file data 370 may be received from entities that are not otherwise contributors to the risk database 100. Additionally, negative file data 370 includes, but is not limited to, fraudulent activity related to multiple products and/or services and multiple communication channels for delivering the products/services. The negative file data 370 may include, but is not limited to, the name(s) of the high risk individuals and entities, addresses, telephone numbers, social security numbers, IP addresses, device identifiers/prints, such as Subscriber Identity Module (SIM) number or the like, biometric data, such as fingerprint data, voice data or the like associated with the fraud perpetrators and the like. The negative file data 370 may also indicate if these data elements belong or are associated with a perpetrator(s) or have been illegitimately used by the perpetrator. Additionally, negative file data 370 may include suspicious account data, otherwise referred to as compromised-account data, which includes data related to computer security violators (i.e., hackers), counterfeited accounts or the like. Additionally, according to some embodiments, the suspicious-account data includes data related to fraudulent telephone calls and/or a counter-fraud intelligence platform that provides information related to viruses, trojans, malware and the like, which targets financial institution customers. According to some embodiments, this may include derogatory files from government agencies, including liens, insurance/Medicare fraud, and the like.

The non-financial institution data 300 may additionally include counterparty data 380. A "counterparty" is defined herein as the parties that are involved in the transaction with non-financial institution customer(s), such as a seller, buyer, caller, network transmitting the call, emailer, social network friend and the like. Counterparty data 380 may include, but is not limited to, data related to customer transactions or interactions that are specific to the counterparty. Additionally, counterparty data includes identifying characteristics of the counterparties such as, but not limited to, name, location, merchant number, parent company and the like. In some embodiments of the invention, the counterparty data 380 is augmented with data regarding the counterparty that can be obtained from the customer data 260, 360 as well as claims data 290, 390. Additionally, counterparty data 380 may include overall statistics associated with the counterparty that are relevant to risk determination.

The non-financial institution data 300 may also include claims data 390 that includes fraud and non-fraud claims made by the customer or the counterparty. The claims data 390 is across multiple non-financial institution products, multiple non-financial institution channels and multiple different non-financial institution entities.

In some embodiments of risk database 100, financial institution data 200 and non-financial institution data 300 are combined in one database. In these embodiments, data may be organized by customer, transaction, accounts, products or the like, regardless of whether it was sourced from a financial institution or a non-financial institution. In other embodiments, data may not be sourced at product or channel levels, but a product or channel may be derived from at least one of the activity/transaction data 210, 310, account data 230, 330, asset and liability data 250, 350 and/or customer data 260, 360. In other embodiments, the data is stored by supplier and then combined as needed for analytic purposes.

Figure 2:
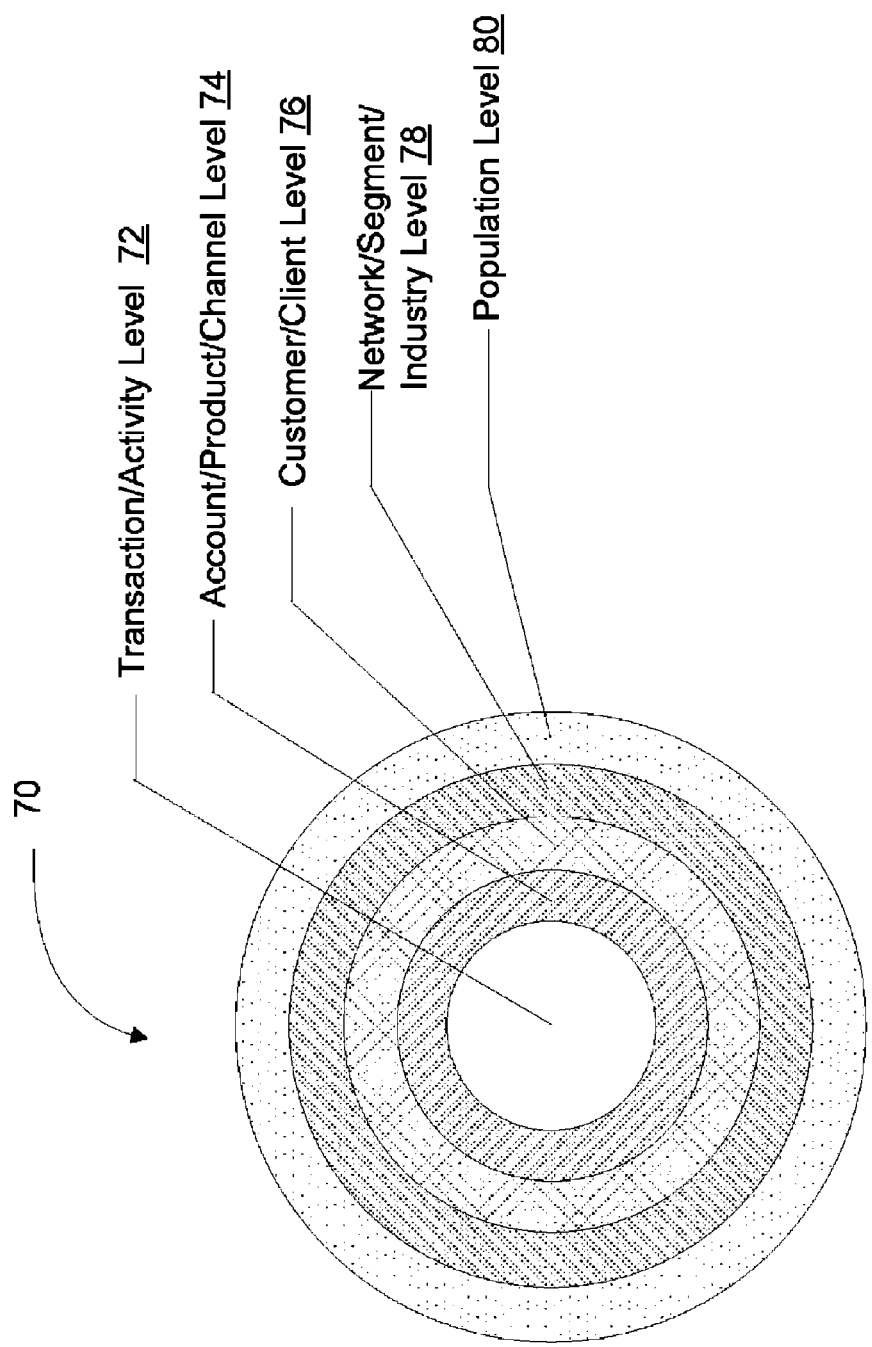
FIG. 2 is a concentric circle diagram that illustrates the risk database's ability to receive data on various different levels, aggregate the data at various levels and to assess risk at the various different levels, in accordance with embodiments of the present invention.

Referring to FIG. 2, a schematic diagram 70 is shown in which concentric circles represent the various levels of information received from financial and non-financial institutions and processed by the centralized risk database, in accordance with embodiments of the present invention. At the first level, represented by the innermost circle, the centralized risk database receives transaction/activity level data 72. For financial institutions, transaction data may include, but are not limited to, payments/purchases with external entities, such as retailers/merchants or the like; deposits; withdrawals; transfers; advances; payments; and the like, made internally within the financial institution. Transaction data identifies the entities which the customer is transacting with. Aggregating transaction/activity level data 72 results in account/product/channel level data 74. Aggregation of accounts can also result in product data.

At the second level, represented by the second innermost circle, the centralized risk database receives account/product/channel level data 74. For financial institutions, accounts may include, but are not limited to, checking accounts, savings accounts, loan accounts, investment accounts and the like. Products may include, but are not limited to, checking products, credit card products, debit card products, loan products, online services, telephone services and the like. Channels may include, but are not limited to, retail locations, ATMs, kiosks, call centers, online/websites, including mobile applications and the like. Aggregating transaction/activity level data 72 across accounts, products, or channels (i.e., account/product/channel level data 74) results in customer/client level data 76.

At the third level, represented by the third innermost circle, the centralized risk database receives customer/client level data 76. As previously noted, a customer includes consumer customers, individuals or joint parties, and business or corporate customers. Aggregating customer/client level data 76 across a given characteristic results in network/segment/industry level data 78.

At the fourth level, represented by the second outermost circle, the centralized risk database receives network/segment/industry level data 78. The network data may be reflected by one or more inter-dependencies or interactions, such as friendship, kinship, financial exchange or other relationships/memberships based upon common interest, common dislike, common beliefs, knowledge or prestige to which a plurality of customers or clients belong. Segment data may be reflected by one or more common characteristics shared by customers or clients. Industry data may be reflected by all of the data within an industry associated with a group of clients. Aggregating customer/client level data 76 across similar characteristics, such as activities, geographic locations, interactions, industries or the like results in network/segment/industry level data 78.

At the fifth level, represented by the outermost circle, the centralized database receives population level data 80. The population data reflects the overall population of customers or clients. Aggregating network/segment/industry level data 78 results in population level data 80.

Figure 3:
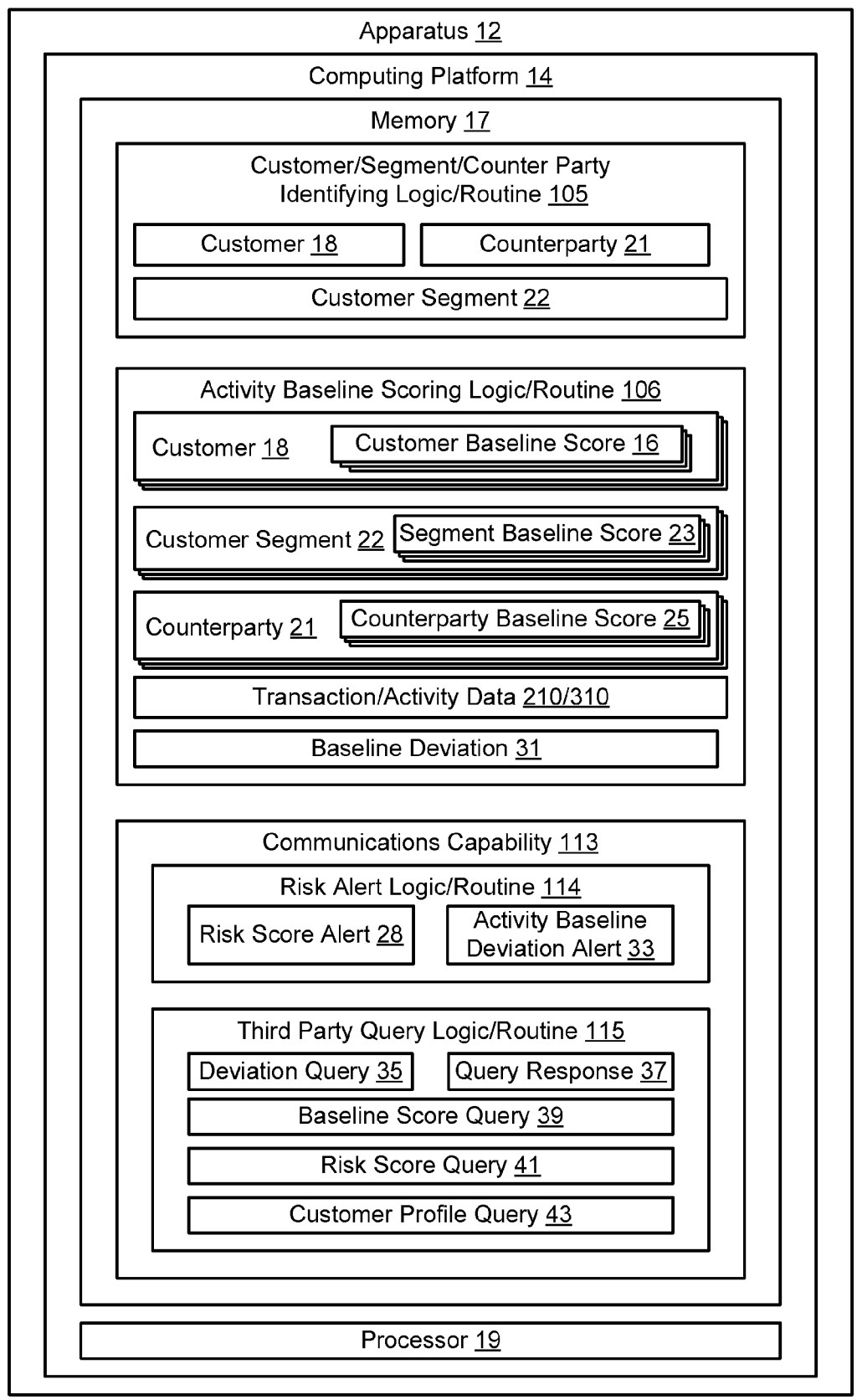
FIG. 3 is a block diagram of an apparatus configured to provide activity baseline scoring, determination of deviations from baseline and alert notification in the event of deviations, in accordance with embodiments of the present invention.

FIG. 3 depicts an apparatus 12 configured to provide customer-specific activity baseline scoring, in accordance with embodiments of the present invention. Baseline determination takes into account various individual activities in determining what is "normal" or a baseline for the individual in terms of risk. In the financial area, baselines can be developed around payment activities, average deposit activities, channel activities and the like. In non-financial areas, baselines can include calling patterns, purchase activities, web surfing activities, travel patterns and the like. Changes in activities can represent a potential for risk. Institutions that identify or are alerted to a deviation from the normal activity may choose to deny a transaction or flag it for further evaluation or investigation. Such activity baseline scoring takes into account individual-by-individual variances in risk. For some activity baseline scores, if the score exceeds a predetermined baseline threshold and/or deviations from the baseline occur the customer may be deemed an increased risk.

The apparatus 12 includes a computing platform 14 having a memory 17 and at least one processor 19 that is communication with the memory 17. The memory 17 stores customer/segment/counterparty identifying logic/routine 105 that is configured to uniquely identify a customer 18, or customers within a customer segment 22, or a counterparty 21 (i.e., parties with whom a customer transacts or interacts with) from within the data received by the centralized risk database 100 for the purpose of subsequently determining activity baseline scoring 16, 23 and 25 and risk scoring 26, 27 and 29 (shown in FIG. 4) for the customer, the customer segment, or the counterparty. Counterparty activity baseline scoring provides an indication of how the counterparty acts in certain transactions. An example of a counterparty activity baseline score that would be monitored for risk purposes is merchant fraud claim rates. If a merchant's fraud rates increase, it may indicate that the merchant has been compromised.

The memory 17 additionally stores activity baseline scoring logic/routine 106, which is configured to determine customer activity baseline scores 16 for a plurality of customers 18; and/or segment activity baseline scores 23 for a population/customer segment 22, which indicates how the segment of customers normally acts from an activity perspective; and/or counterparty activity baseline scores 25 for a counterparty 21, which indicates how the counterparty normally acts from an activity perspective. The customer activity baseline score 16, the segment activity baseline score 23 and the counterparty activity baseline score 25 define the normal activity for the customer or the segment of customers or counterparty.

In specific embodiments, the customer activity baseline score 16, the segment activity baseline score 23 and the counterparty activity baseline score 25 are based on financial institution data 200 and/or non-financial institution data 300 stored in the centralized risk database 100 (shown in FIG. 1) such as, but not limited to, individual check transactions, debit transactions, ACH transactions, bill pay transactions, or credit card transactions. In addition, negative file data 270, 370 and/or asset and liability data 250, 350 (shown in FIG. 1) may be utilized to determine the baseline risk scores 16, 23 and 25. Additionally, the customer activity baseline score 16, the segment activity baseline score 23 and the counterparty activity baseline score 25 may be based on non-financial institution data 300, such as retailer data, utility data or the like.

As such, activity baseline scoring logic/routine 106 accesses data, such as financial institution data 200 and/or non-financial institution data 300 or the like to determine the customer activity baseline score 16, the segment activity baseline score 23 and the counterparty activity baseline score 25. For example, the activity baseline-scoring logic/routine 106, when calculating a customer activity baseline score 16, a segment activity baseline score 23, and/or a counterparty activity baseline score 25 considers, for each customer, how often and when the customer: uses an ATM; calls a call center;

visits a branch location; accesses online banking; writes a check; uses a debit card; uses a credit card; makes a deposit; etc. In addition to frequency information, the activity baseline scoring logic/routine 106 may consider the amounts of transactions; location of activities; channels and products used; asset and liability balances maintained and the like. The activity baseline scoring logic/routine 106 then calculates an activity baseline score that represents those considerations and defines what is "normal" or baseline for that particular customer 18, customer segment 22 or counterparty 21.

It should also be noted that multiple activity baseline scores 16 can be determined for a customer 18, multiple segment activity baseline scores 23 can be determined for the associated customer segment 22 and/or multiple counterparty activity baseline scores 25 can be determined for the associated counterparty 21. This is because activity baseline scores are activity-based; meaning that baseline scores are associated with one or more activities, characteristics, traits or the like associated with the customer, segment or counterparty. As such, multiple customer activity baseline scores 16 and/or multiple segment activity baseline scores 23 and/or multiple counterparty activity baseline scores 25 aid in better understanding the activity of the customer or segment. For example, an activity baseline score may be associated with the locations where the customer or segment interacts/transacts and/or persons/entities that the customer or segment transacts with. A further example includes customer activity baseline scores and/or segment scores and/or counterparty scores associated with customer deposits and/or withdrawals. Such deposit-associated and/or withdrawal-associated scores provide insight into changes in income; whether the customer is liquidating assets, overdrawing across multiple financial institutions and the like. Further, a comprehensive or overall activity baseline score may be determined for a customer 18, a customer segment 22, or a counterparty 21 that takes into account all of the customer's/customer segment's/counterparty's activities, characteristics, traits and the like.

Additionally, activity baseline scoring logic/routine 106 is configured to determine baseline deviations 31 from the customer activity baseline scores 16 and/or segment activity baseline scores 23 and/or counterparty activity baseline scores 25. According to specific embodiments, baseline deviations 31 may be configured to be based on a single event/transaction, or a series or combination of events/transactions. For example, a withdrawal in excess of a baseline withdrawal amount for the particular individual/customer may define a baseline deviation 31, or a certain number of withdrawals, in excess to the individual/customer's baseline number of withdrawals, over a designated period, may constitute a baseline deviation 31. In addition, in certain embodiments, in order to ensure that timely corrective actions occur, the events/transactions associated with an activity baseline deviation may be determined and reported to the activity baseline scoring logic/routine 106 in real-time or near-real-time to the occurrence of the deviation; and/or in periodic batch file processing. It should also be noted that deviations may include negative deviations, i.e., deviations that increase risk and negatively impact the activity baseline scores 16, 23 and 25 and positive deviations, i.e., deviations that decrease risk and positively impact the activity baseline scores 16, 23 and 25.

Additionally, apparatus 12 includes a communication capability 113 that is configured to communicate risk scores (shown in FIG. 4) and activity baseline scores to financial institutions, non-financial institutions, customers and counterparties. In some embodiments, the customer or counterparty must indicate consent to have their risk scores or activity baseline scores shared with another entity. The communications capability 113 is configured to communicate these scores to financial institutions and non-financial institutions upon receiving requests and meeting other predefined requirements for obtaining receipt of this information. The communications capability 113 may further be configured to provide periodic updates of these scores to customers, counterparties, financial institutions and non-financial institutions. In specific embodiments of the invention, the updates may be sent in parallel, so that all entities receive updates at the same time, or the updates may be sent at different times.

Additionally, the communications capability 113 includes risk alert logic/routine 114 that is configured to automatically generate and initiate communication of risk score alerts 28 to predetermined entities upon determination of a predefined threshold, or changes in customer risk score 26 (shown in FIG. 4) or the like. Additionally, in other specific embodiments, risk alert logic/routine 114 is configured to generate and initiate communication of risk score deviation alerts 33 to predetermined entities upon determination of a predefined deviation threshold or occurrence of a predefined deviation event or combination of events. The risk score alerts 28 and/or risk score deviation alerts 33 may be configured to be communicated to the business, such as the financial institution, industry-wide, such as to all financial institutions, to the customer/client, to retailers, government agencies or the like. In certain embodiments of the invention, the risk score alerts 28 and risk score deviation alerts 33 may be communicated to businesses, financial institutions and non-financial institutions that have an active relationship with the customer and may, in some embodiments, require the business to subscribe to an alert service. Additionally, the risk alert logic/routine 114 may be configured to communicate the alert to a designated entity based on the type of deviation or the level of deviation, e.g., certain deviations will be configured to send alerts to the business, while other deviations, typically more severe deviations, will be configured to be sent to those who have a business relationship with the customer/segment/counterparty, specific businesses within an industry, industry-wide and/or to government agencies. In this regard, the risk score deviation alert 33 may notify an entity of a negative deviation and/or a positive deviation and the risk score alert 28 may notify the entity of an increase or decrease in the risk score 26, 27 or 29.

In addition, the communications capability 113 stores third-party query logic/routine 115 that is configured to provide for receipt of third-party deviation queries 35, which allow for a third-party, such as a financial institution or non-financial institution, e.g., a merchant or the like, to access system 10, and specifically access third-party query logic/routine 115 to determine if an event/activity associated with a customer is a deviation from the norm (i.e., a deviation from the customer's baseline score or the like). Based on the determination, a query response 37 is communicated to the third-party, which serves to notify the third-party of the verification/non-verification of the deviation. In addition, the third-party query logic/routine 115 may be configured to receive baseline score queries 39 and/or risk score queries 41, from customers, counterparties, financial institutions, or non-financial institutions, which, in response, return a query response 37 that includes the requested baseline score 16, 23 or 25 or requested risk score 26, 27 or 29. In some embodiments of the invention, a third-party request for a baseline score or a risk score initiates periodic transmissions of those scores to the third-party (e.g., request a score at account opening and receive monthly updates). In other embodiments, the third-party query logic/routine 115 is configured to receive customer profile queries 43, which are configured to cause the processor 19 to query the customer data files 260 and 360 and the negative file data 270 and 370 to confirm a customer's personal information and other customer criteria is legitimate and up-to-date.

In additional embodiments, communications capability 113 may be configured to communicate notification of updates to negative file data 270 and/or 370 to predetermined entities upon determination of a negative file update. In still further additional embodiments, the communications capability 113 may be configured to communicate notification of suspicious activity to predetermined entities. Suspicious activity may include, but is not limited to, when a customer's personal data and/or financial data appear within negative file data 270 or 370 (e.g., their telephone number); when there is a deviation in the customer's risk score 26; accounts are opened or closed in the customer's name at financial or non-financial institutions as recorded in account data 230 and 330; biometric data provided does not match biometrics on file for the customer 18; and the like.

In some embodiments of the invention, the customer or counterparty may be required to indicate consent to have their risk scores or activity baseline scores shared with a third-party. Additionally, in other embodiments of the invention, the third-party may be required to demonstrate that they meet the requirements for obtaining these scores based upon legal and regulatory requirements. In other embodiments of the invention, the third-party may be required to demonstrate that they have met the predefined requirements established by the company (or companies) managing the risk database 100, the activity baseline scores 16, 23 or 25, activity baseline deviation 31, the risk scores 26, 27 or 29, the risk alert logic/routine 114 and or the third-party query logic/routine 115.

The risk alert logic/routine 114 and the third-party query logic/routine 115 may be configured to communicate the alerts 28 or 33 or the query response 37 via a chosen communication channel, such as letter, email, Short Message Service (SMS)/text, voicemail or the like. Since most queries and alerts will be communicated to businesses, financial institutions and non-financial institutions, in many instances the queries and/or alerts will be configured to be communicated electronically either in real-time, near-real-time or periodic batch files to the business' system, database or the like. These business-to-business communications can include one or multiple queries and/or alerts pertaining to one or multiple customers, segments or counterparties.

Figure 4:
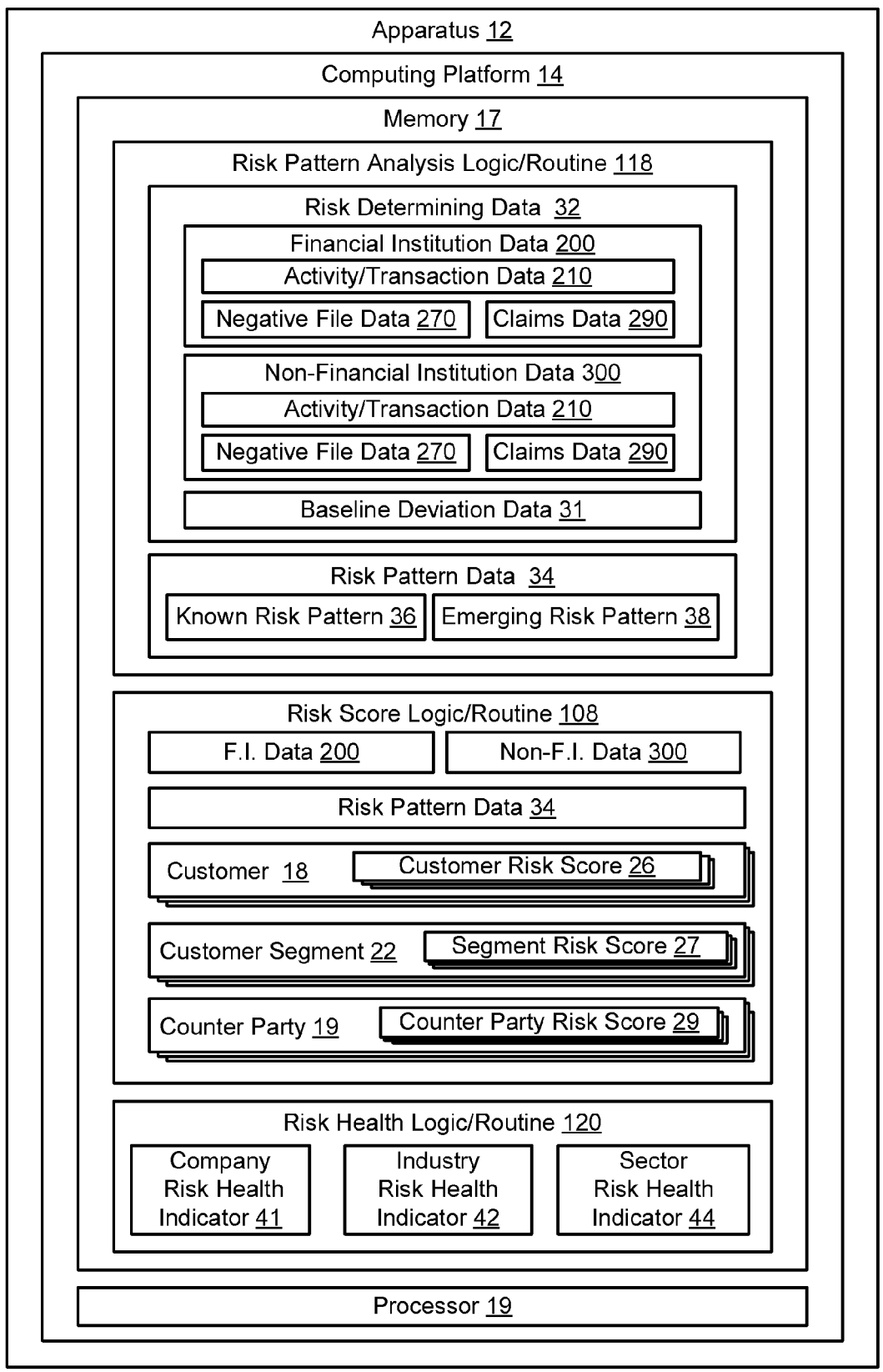
FIG. 4 is a block diagram of an apparatus configured to provide risk pattern determination and, specifically, new pattern types based on data in the risk database, deviations from baseline, claim data and negative activity data, in accordance with embodiments of the present invention.

FIG. 4 illustrates an apparatus 12 configured for risk scoring and risk pattern analysis, in accordance with an embodiment of the present invention. The apparatus includes a computing platform 14 having a memory 17 and at least one processor 19 in communication with the memory 17. The memory 17 of apparatus 12 includes risk pattern analysis logic/routine 118 that is configured to analytically identify and monitor and risk pattern data 34 including known risk patterns 36, such as known frauds or the like and new emerging risk patterns 38, such as new emerging types of risk or the like. A risk pattern identifies one or more data elements that is statistically linked to loss due to a specific risk type (e.g., fraud, credit, etc.). Risk patterns are identified and monitored based on any combination of financial institution data 200 and/or non-financial institution data 300. In specific embodiments of the invention, transaction/activity data 210, and/or 310; claims data 290 and/or 390 and/or negative file data 270 and/or 370 may be integral in identifying known and/or emerging risk patterns, although any data in risk database 100, alone or in combination may be used to identify known and/or emerging risk patterns. Additionally, according to specific embodiments, risk pattern analysis logic/routine 118 relies on activity baseline deviation data 31, typically in conjunction with other data, such as negative file data 270 and/or 370 (shown in FIG. 3) or the like to identify and monitor risk patterns and, in specific embodiments, identify areas of high levels of loss due to specific risk type.

In certain embodiments of the invention, when new/emerging risk patterns 38 are identified, the probability to manage these new risks are also identified and shared with various businesses who are customers of the risk pattern data 34 or the risk database 100. Additionally, in some embodiments, the emerging risk pattern 38 may provide one or all of the following: probability of incurring a gross or net loss associated with new/emerging risk; means to identify the risk pattern and/or recommendations regarding how to prevent transactions or combinations of activities/transactions associated with the risk (vs. flagging them for further evaluation). The communication of these new or emerging risk patterns 38 to the appropriate financial and non-financial institutions may be managed via communications capability 113 (shown in FIG. 3). In some embodiments, new/emerging risk patterns 38 are also communicated to the risk score logic/routine 108, initiating an update of customer, segment/population, and counterparty risk scores 26, 27, and 29. In addition, once a new/emerging risk pattern 38 is identified, the corresponding known risk file is updated to reflect the new/emerging risk pattern 38.

Additionally, the memory 17 of apparatus 12 stores risk score logic/routine 108 that is configured to determine a customer risk score 26 for customers 18, a segment risk score 27 for customer segment 22 and/or a counterparty risk score 29 for counterparties 19. The customer risk score and/or segment risk score and/or counterparty score provides an indication of the likelihood that the customer, the segment of customers or the counterparty represents a risk that is likely to result in a financial loss, such as likelihood to default, perpetrate a fraud in the future or the likelihood that the counterparty, customer or segment is susceptible to fraud or default in the future. According to specific embodiments, the customer risk score 26 or segment risk score 27 or counterparty risk score 29 may be based off of risk patterns determined from financial institution data 200, such as, but not limited to, activity/transaction data 210 (shown in FIG. 1), asset and liability data 250 (shown in FIG. 1), negative file data 270 (shown in FIG. 1) and the like. As previously discussed, the risk pattern analysis logic/routine 118 may be implemented to identify incidences of known risk patterns 36 in a customer's, segment's or counterparty's profile that correlate to loss. In some embodiments, the risk score logic/routine 108 weighs the incidences of risk patterns based upon the frequency, mix and probability of loss associated with the individual risk patterns and the combination of risk patterns in a customer's, segment's or counterparty's profile. In alternate embodiments, the customer risk score 26 or segment risk score 27 or counterparty risk score 29 may be additionally based on risk patterns based off of non-financial institution data 300, such as, but not limited to, activity/transaction data 310 (shown in FIG. 1), asset and liability data 350 (shown in FIG. 1), negative file data 370 (shown in FIG. 1) and the like. In specific embodiments of the invention, negative file data 270 and/or 370 are implemented in risk scoring to incorporate history of risk and any negatives associated with customer data 260 and/or 360 (shown in FIG. 1) (e.g., incorrect telephone number, high risk zip code or the like).

The customer and counterparty risk scores 26, 29, when compared to segment risk scores 27, can tell a company whether a customer represents an average, above average or below average risk of loss. In some embodiments, the score may include patterns related to the ability to detect a risky transaction, or combination of transactions, or traits in process, which if detected could prevent or mitigate the risk event. In some embodiments, the segment risk score 27 provides for identifying locations, zip codes, merchants and the like that have above average risk (e.g., fraud, etc.) rates.

Optionally, memory 17 of apparatus 12 may store risk health logic/routine 120 that is configured to determine a company risk health indicator 41, industry-wide risk health indicator 42 and/or sector risk health indicator 44 for a sector of an industry, examples of sectors include specific businesses within the industry (e.g., luxury auto sector of the auto industry). The risk health indicator, which may be configured as a score or the like, provides an indication of how well the industry, sector of the industry or company is managing risk, such as fraud, credit, or the like or, conversely, how poorly the industry, sector of the industry or company is doing in not managing risk. Additionally, according to specific embodiments, the risk health indicator 41, 42 and/or 44 provides for identifying points of compromise, such as ATMs, retailers, processors or the like, which have above average fraud rates indicative of having been compromised/hacked. In additional embodiments, the risk health indicator 41, 42 and/or 44 provides for identifying locations, zip codes, merchant locations and the like that have above average risk (e.g., default, fraud, etc.) rates.

Figure 5:
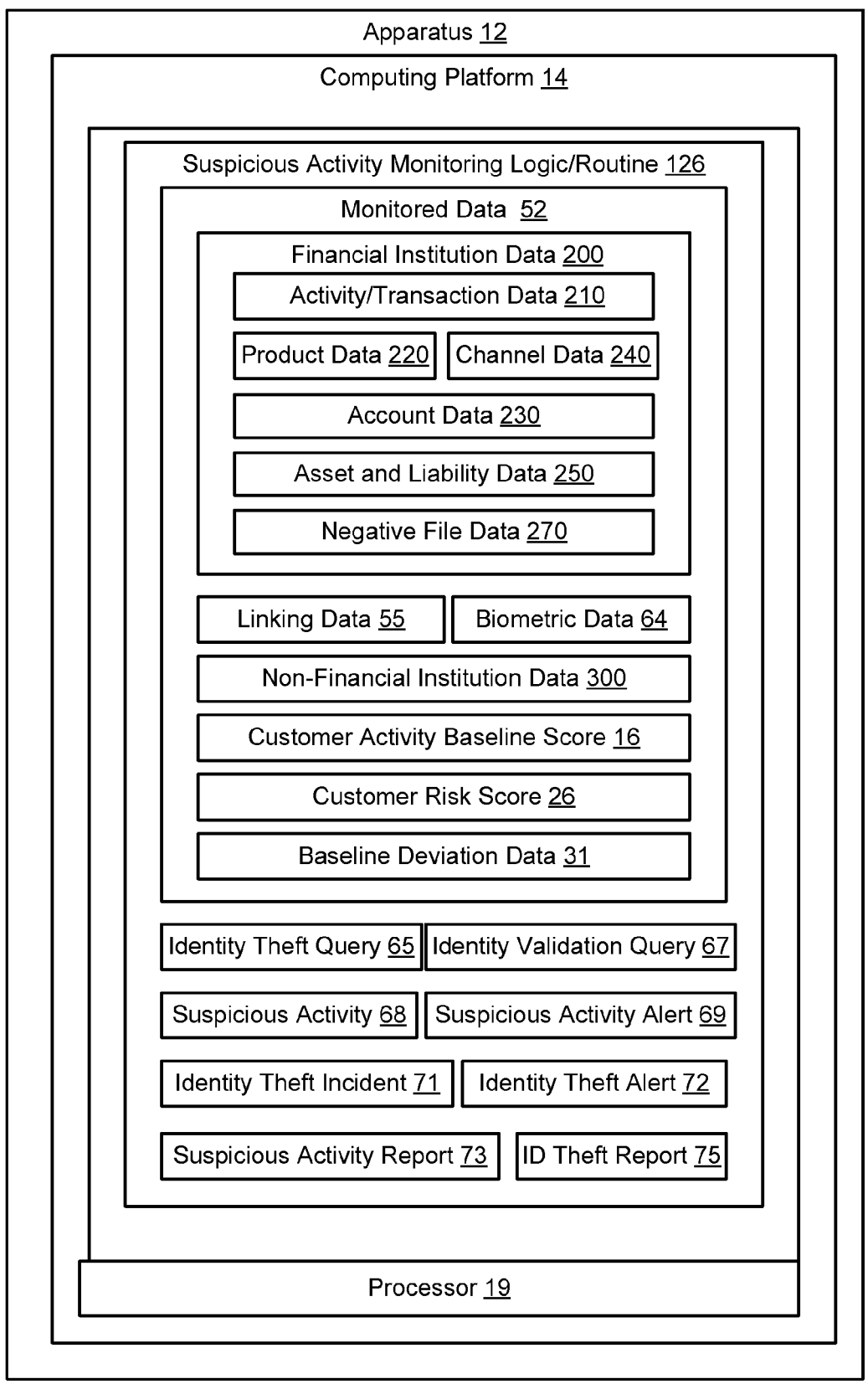
FIG. 5 is a block diagram of an apparatus configured to provide identity theft monitoring based on asset and liability data and financial institution transaction activity, including deposits and security investments and activity/transactional data, in accordance with embodiments of the present invention.

Turning the reader's attention to FIG. 5, depicted is an apparatus 12 configured for suspicious activity monitoring, in accordance with further embodiments of the invention. The apparatus 12 includes a computing platform 14 having a memory 17 and at least one processor 19. The memory stores suspicious activity monitoring logic/routine 126 that is configured to provide comprehensive suspicious activity monitoring across multiple financial institution products, multiple financial institution channels and multiple financial institutions. As such, the monitoring is not limited to credit products/data but, since the logic/routine 126 has access to all of the data provided in the centralized risk database 100, including deposit data and investment/security data, including account data and product data which does not necessarily require credit checks. As such, the monitored data 52 is not limited to conventionally monitored credit data, but also any financial institution data 200 including, but not limited to, multiple financial institutions' activity/transaction data 210, product data 220 and channel data 240. In addition, monitored data 52 may include account data 230, such as account opening and closing data and the like, that is used to identify suspicious activity potentially associated with an identity theft incident. Additionally, the monitored data 52 may include asset and liability data 250, including asset data, such as deposit balances, account gone to loss events, investments and liability data, such as credit outstanding, credit limits, payment status and the like.

The monitored data 52 may also include linking data 55 that links activities/transactions to a customer, such as personal identifiers, e.g., name, address, social security number or the like. Additionally, according to specific embodiments, the monitored data 52 may also include emerging data, such as biometric data 64, including voice, fingerprint and the like. In some embodiments, the personal linking data 55 and biometrics data 64 are found within the risk database 100 in the customer data 260 and/or 360. The suspicious activity monitoring logic/routine 126 monitors customers' customer data 260, 360; account data 230, 330 and activity/transaction data 210, 310, for suspicious activity 68. Suspicious activities 68 include, but are not limited to, when a customer's personal data and/or financial data appear within negative file 270 or 370 (e.g., their telephone number); when there is a deviation in the customer's risk score 26; accounts are opened or closed in the customer's name at financial or non-financial institutions as recorded in account data 230 and 330; biometric data provided does not match biometrics on file for the customer 18; and the like.

The suspicious activity monitoring logic/routine 126 may further be configured to receive identity theft queries 65 from financial institution, non-financial institution entities and/or customers, and determine whether a queried transaction, activity, person or entity represents a likely identity theft incident. The suspicious activity monitoring logic/routine 126 may rely on any of the monitored data 52 to determine if the queried transaction, activity, person or entity represents a likely identity theft incident. Based on the results of the query, a response may be communicated to the querying party and/or other parties as dictated by the nature of the query, the likelihood of the identity theft incident or the like. Further, the suspicious activity monitoring logic/routine 126 may further be configured to receive identity validation queries 67 from financial institution, non-financial institution entities and/or customers, and validate the identity of a person or entity identified in the query. The suspicious activity monitoring logic/routine 126 may rely on any of the monitored data 52 to validate the identity of the queried person or entity. Based on the results of the validation, a response may be communicated to the querying party and/or other parties that serve to validate or repudiate the identity of the person or entity.

Based on the occurrence of a suspicious activity 68, the logic/routine 126 may, according to specific embodiments, generate and communicate a suspicious activity alert 69 to one or more designated entities, such as financial institutions, the customer, non-financial institutions or the like. Additionally, according to further specific embodiments, the suspicious activity monitoring logic/routine 126 may be configured to generate and communicate suspicious activity reports 73, which may be communicated to designated entities, such as financial institutions, non-financial institutions, customers or the like. Customer review of such reports provides for verification of the compromising event or data element.

In certain embodiments of the invention, the suspicious activity reports 73 also fulfill the need to supply customers/clients with the data that is used to detect a suspicious activity, and create their activity baseline scores and/or their risk scores. Additionally, in some embodiments, upon receipt of such reports, should a customer identify an error in the data reported, they can work with either the supplier of the data to correct it, or with the entity managing the risk database 100.

Based on the confirmation of an identity theft incident 71 associated with identified suspicious activity 68, the logic/routine 126 may, according to specific embodiments, generate and communicate an identity theft alert 72 to one or more designated entities, such as financial institutions, the customer, non-financial institutions or the like. Additionally, according to further specific embodiments, the suspicious activity monitoring logic/routine 126 may be configured to generate and communicate ID theft reports 75, which may be financial institutions, non-financial institutions, customers or the like.

Figure 6:
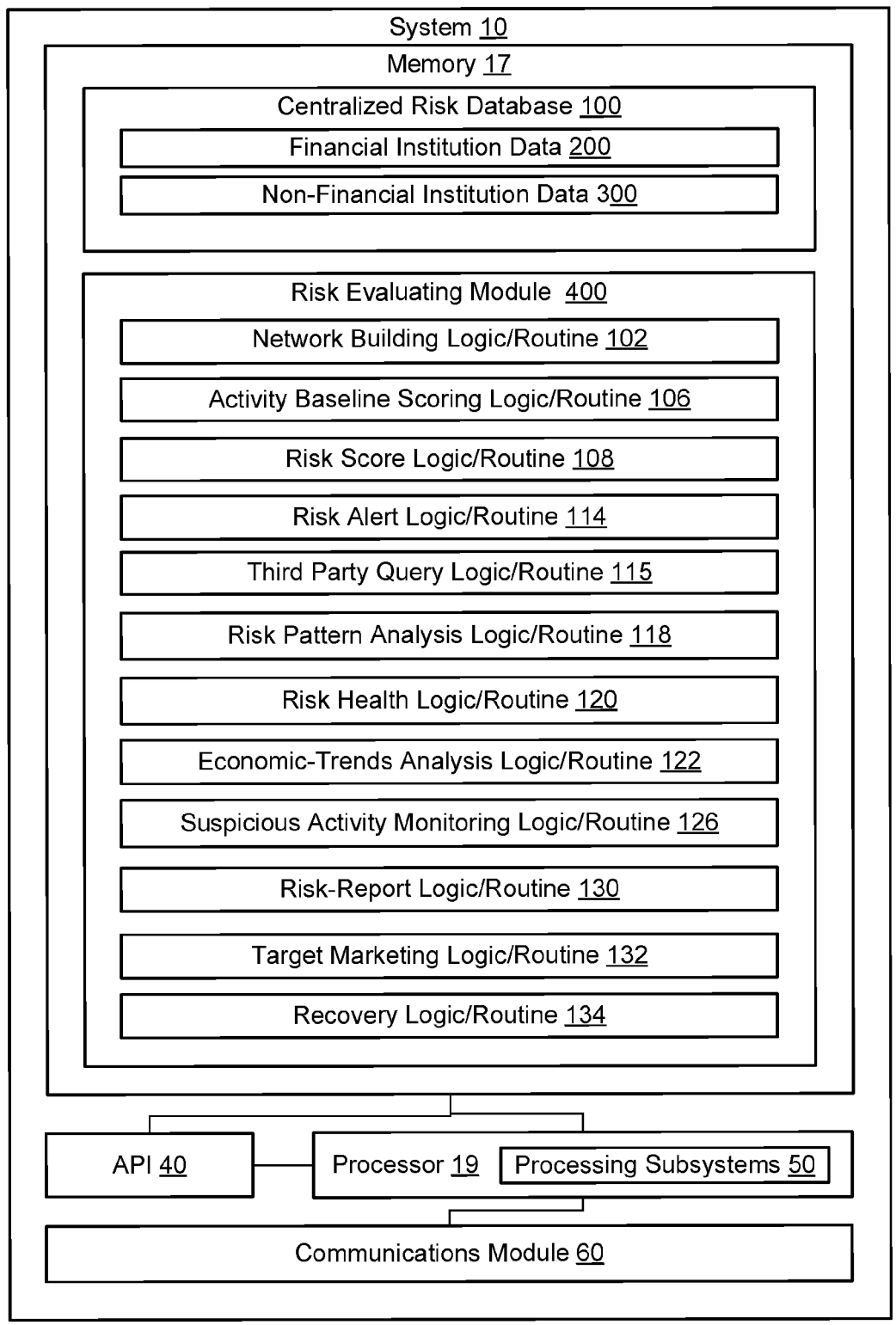
FIG. 6 is a more detailed block diagram of the system of FIG. 1, in accordance with an embodiment of the present invention.

FIG. 6 provides a more detailed block diagram of the system 10, which, according to some embodiments, collects transaction data across financial products and channels from multiple financial institutions, data aggregators, and non-financial institutions for the purpose of reducing risk, for example, risk associated with credit and/or fraud; tracing money trails associated with illegitimate uses and the like.

The system 10 may include one or more of any type of computerized device. The present system and methods can accordingly be performed on any form of one or more computing devices.

The system 10 includes memory 17, which may comprise volatile and non-volatile memory, such as read-only and/or random-access memory (RAM and ROM), EPROM, EEPROM, flash cards, or any memory common to computer platforms. Further, memory 17 may include one or more flash memory cells, or may be any secondary or tertiary storage device, such as magnetic media, optical media, tape, or soft or hard disk.

Further, system 10 also includes processor 19, which may be an application-specific integrated circuit ("ASIC"), or other chipset, processor, logic circuit, or other data processing device. Processor 19 or other processor such as ASIC may execute an application programming interface ("API") 40 that interfaces with any resident programs, such as the risk evaluating module 400 and related applications/routines and/or logic or the like stored in the memory 17 of the system 10.

Processor 19 includes various processing subsystems 50 embodied in hardware, firmware, software, and combinations thereof, that enable the functionality of system 10 and the operability of the system on a network. For example, processing subsystems 50 allow for initiating and maintaining communications and exchanging data with other networked devices. For the disclosed aspects, processing subsystems 50 of processor 19 may include any subsystem used in conjunction with the risk evaluating module 400 or the like or sub-components or sub-modules thereof.

System 10 additionally includes communications module 60 embodied in hardware, firmware, software, and combinations thereof, that enables communications among the various components of the system 10, as well as between the other devices in the network. Thus, communications module 60 may include the requisite hardware, firmware, software and/or combinations thereof for establishing a network communication connection. It should be appreciated that the communications module 60 is the mechanism through which subscribers to various services provided by embodiments of the present invention can submit queries to the system 10. It should also be appreciated that the communications module 60 is the mechanism through which embodiments of the present invention sends alerts/reports/scores/data to configured recipients and the like.

The memory 17 includes risk evaluating module 400 that is executable by processor 19. The risk evaluating module 400 receives data 200 and 300. As previously discussed, the financial institution data 200 may include, but is not limited to, activity/transaction data 210, product data 220, account data 230, channel data 240, asset & liability data 250, customer data 260, negative file data 270, counterparty data 280 and claims data 290. Further, the non-financial institution data 300 may include, but is not limited to, activity/transaction data 310, product data 320, account data 330, channel data 340, asset & liability data 350, customer data 360, negative file data 370, counterparty data 380 and claims data 390.

The risk evaluating module 400 includes a plurality of logic/routines configured to assess, manage and mitigate risk based on use of the data collected in the centralized risk database 100. The logic/routines shown in FIG. 6 are by way of example only and, as such, risk evaluating module 400 may include more or less logic/routines as dictated by the implementation of system 10. In specific embodiments, risk evaluating module 400 includes network building logic/routine 102. The network building logic/routine 102 is configured to gather data 200 and 300 from the centralized risk database 100 and format and correlate the data for the purpose of communication to and from integrated risk and customer data network 500 (shown in FIG. 1). The network 500 provides for communication of the comprehensive data set. Analytics providers can access the network 500 to obtain a single source of high quality data, thereby reducing costs associated with providing analytics. Further, financial institutions can access the network 500 to obtain industry-wide information about specific customers' history of risk/fraud and thereby, reduce costs associated with transacting with high-risk customers, as well as access to other aggregated information for the purpose of managing risk (e.g., drawing down 100% of their lines of credit across different financial institutions may inform a different bank's decision to pay an account gone to loss event, or an investment company's decision to lend on margin). In other embodiments of the invention, financial institutions or non-financial institutions can receive notification from the system 10 of a change, negative or positive, in risk status.

The risk evaluating module 400 further includes previously described activity baseline scoring logic/routine 106. The activity baseline scoring logic/routine 106 generates one, and in many instances multiple, activity baseline score(s) for individual customers, or segments of customers or counterparties. The activity baseline score defines the normal transaction activity for a customer or a segment of customers and may be customer-activity or customer-characteristic specific. According to specific embodiments, the activity baseline scoring logic/routine 106 is configured to access financial institution data 200, and, in some embodiments, the non-financial institution data 300 to determine the activity baseline score. In specific embodiments, the activity baseline scoring logic/routine 106 is configured to calculate/determine an activity baseline score based on a plurality of transaction customer-specific parameters, including but not limited to, how often and when the customer: uses an ATM; calls a call center; visits a branch location; accesses online banking; writes a check; uses a debit card; uses a credit card; makes a deposit; the amounts of the related transactions; cross-channel purchasing activities, etc. The activity baseline scoring logic/routine 106 then calculates an activity baseline score that represents those considerations and defines what normal and abnormal activities are for a customer.

The activity baseline scoring logic/routine 106 is further configured to determine positive or negative deviations from the baseline score and provide alerts based on the deviations. According to specific embodiments, risk deviations may be configured to be based on a single event/transaction, or a series of events/transactions. Thus, a deviation may be defined as a predetermined degree of deviation from the activity baseline score or the like. It should also be noted that deviations from the baseline may include negative deviations, (i.e., deviations that increase risk) and positive deviations (i.e., deviations that decrease risk).

Further, risk evaluating module 400, according to specific embodiments, includes risk score logic/routine 108 that is configured to determine one or more risk scores for customers, segments or populations of customers and/or counterparties. The risk score and/or segment risk score and/or counterparty risk score provides an indication of the likelihood that the customer, the segment of customers or the counterparty represents a risk that is likely to result in a financial loss, such as likelihood to default, perpetrate a fraud in the future, be involved in a financial unlawful act. In some embodiments, it may also indicate the likelihood that the counterparty, customer or segment is susceptible to become a victim of fraud, default or other risk in the future. A customer or counterparty may have multiple risk scores (e.g., a risk score for fraud; a risk score for credit loss; a risk score for money laundering, an overall risk score and the like). The risk score is based upon risk pattern data 34 which identifies risky activities/transactions, patterns and combinations thereof.

According to specific embodiments, the risk scores may be based on risk patterns based off of financial institution data 200. In alternate embodiments, the risk scores may be additionally based on risk patterns based off of non-financial institution data 300. In further embodiments of the invention, the risk scores may be based on financial institution negative file data 270, and optionally non-financial institution negative file data 370 to incorporate history of risk and any negatives associated with customer data (e.g., incorrect telephone number, high risk zip code or the like).

The risk score logic/routine 108 may be further configured to assign customers or groups of customers to segments based on their risk score. For example, according to specific embodiments, the risk scores may be based on a scale of one to ten, where one is the lowest risk and ten is the highest risk. The risk score logic/routine 108 may be configured to assign customers having a risk score between one and three into a low risk segment/group. This low risk group's activities are not considered high risk, nor are they associated with any high risk companies or individuals. There is a low chance that customers in the low risk segment will act in such a manner such that those doing business with them will lose money due to fraud, default or other type of risk. In some embodiments of the invention, these customers are assigned a low risk score because their financial activity is highly predictable, rarely deviating from their activity baseline score as calculated by the activity baseline scoring logic/routine 106.

The risk score logic/routine 108 may be further configured to assign customers having a risk score between eight and ten to a high risk group, indicating those who do business with these people or entities have an above average risk of losing money in these business transactions. The high risk group may include customers who engage in multiple high risk activities (e.g., pay bills late, associate with known dishonest individuals, and make large number of cash advances against credit cards to cover account gone to loss events, etc.). The high risk group may also include customers that have committed fraud in the past. The high risk group may also include customers who have highly variable activities which make one or more activity baseline scores unreliable and not predictive.

The risk evaluating module 400, according to some embodiments, also includes previously described risk alert logic/routine 114. The risk alert logic/routine 114 generates and communicates risk score alerts and/or risk deviation alerts to the appropriate financial institution entities, non-financial institution entities or customers based on a predetermined increase or decrease in risk score, a predetermined level of deviation (positive or negative) and/or a specific deviation event or combination of deviation events.

Additionally, the risk evaluating module 400, according to some embodiments, also includes previously described third party query logic/routine 115. The third party query logic/routine 115 is configured to receive deviation queries, risk score queries or activity baseline score queries from third parties and determine whether activities or events exhibited by customers at the third party are deviations from the norm (i.e., deviations from the activity baseline score) or determine the current risk score or activity baseline score and, based on the determination, communicate query responses back to the third party. In other embodiments, the third party query logic/routine 115 is configured to look at the customer data 260 and 360 and the negative file data 270 and 370 to confirm the customer's personal information and is legitimate. In some embodiments, the third party query logic/routine 115 also sets up and executes ongoing refreshes of risk scores and activity baseline scores on a periodic basis to third parties.

According to some embodiments, the risk-evaluating module 400 also includes previously described risk pattern analysis logic/routine 118. The risk pattern analysis logic/routine 118 monitors the collected data, identifies a known risk or a new/emerging type of risk, and generates risk pattern reports and/or prompts risk pattern alerts. The known risk or a new/emerging risk type is identified by analyzing activity/transaction data 210, 310; claims data 290, 390; and/or the negative file data 270, 370. In some embodiments of the invention, at least one of the following data elements are also included in the detection of new/emerging risk patterns: product data 220, 320; account data 230, 330; channel data 240, 340; asset and liability data 250, 350; customer data 260, 360 and counterparty data 280, 380. According to specific embodiments, the risk pattern analysis logic/routine 118 is configured to generate industry-wide reports, as well as reports for individual financial institutions or non-financial institutions. In addition to pattern reporting, risk pattern analysis logic/routine 118 may be further configured to prompt generation and communication of risk pattern alerts to designated entities who can then take appropriate action. For example, if risk pattern data shows high correlation of fraud activity coming from customers who take out cash advances against credit cards while concurrently overdrawing their checking accounts, designated entities may receive an alert/report outlining the new risk pattern and, in some embodiments, the probability of loss and/or recoverability associated with this risk pattern.

Further embodiments of the risk evaluating module 400 include previously mentioned risk health logic/routine 120 that is configured to determine an industry-wide risk health indicator and/or risk health indicator for a segment of an industry, examples of segments, include luxury autos (auto industry); extended stay hotels (lodging industry); credit unions in Ohio (versus all of the United States financial institutions) or the like. The risk health indicator, which may be configured as a score or the like, provides an indication of how well the industry, segment of the industry or customer is managing risk (e.g., detecting, preventing, mitigating, recovering, etc.).

According to other specific embodiments, the risk evaluating module 400, leveraging data from the risk database 100, also includes economic-trends analysis logic/routine 122. The economic-trends analysis logic/routine 122 monitors the collected data, identifies trends beyond that of fraud/risk which relate to economic health and generates reports. In some embodiments of the invention, the economic-trends analysis logic/routine 122 may include tools to monitor market risk. In other embodiments of the invention, the economic-trends analysis logic/routine 122 may generate historical economic activity reports and/or economic forecasts at segment, industry and geographic levels.

According to further specific embodiments, the risk evaluating module 400 also includes previously described suspicious activity monitoring logic/routine 126. As noted, the suspicious activity monitoring logic/routine 126 monitors customers' transactions, accounts and personal information and sends identity-theft alerts when suspicious activity is identified. The suspicious activity monitoring logic/routine 126, because it has access to all of the data 200 and 300 in the centralized risk database 100, provides more comprehensive protection than currently employed identity-theft prevention systems provided by credit bureaus, which are generally limited to credit products/data and do not include credit card transaction data. In specific embodiments, the suspicious activity monitoring logic/routine 126 is configured to monitor transactions and asset/liability accounts and balances across multiple products and multiple financial institutions, including deposit and investment transactions and balances, which are not generally reported to a credit bureau.

According to still further embodiments, the risk evaluating module 400 may also include risk-report logic/routine 130. The risk-report logic/routine 130 provides risk reports that include an individual's, a business' or a segment of the business' history of risk/fraud. For example, according to certain embodiments, risk reports may be configured to be similar to credit reports, except risk reports emphasize risk-related information. Risk reports may be used to develop an identity score or other identity authentication capabilities based upon the data collected regarding their financial activities, demographics and non-financial activities (e.g., calling activity; Internet surfing activity and the like).

According to other specific embodiments, the risk evaluating module 400 also includes a target marketing logic/routine 132. The target marketing logic/routine 132 is configured to monitor the collected data, identify customers who meet specific risk, activity and/or likely profitability specifications and generate target marketing lists or reports. The target marketing logic/routine 132 can also generate segmentation models for the purposes of marketing to customers based on their assets, net worth, activities, likely profitability and/or risk attributes.

Moreover, in other embodiments, the risk evaluating module 400 may also include recovery logic/routine 134. The recovery logic/routine 134 is configured to leverage the financial information data and the non-financial institution data in recovery activities, such as providing data and analytic support to the legal process, identifying parties involved in the risk event, recovering lost funds from appropriate parties and the like.

Figure 7:
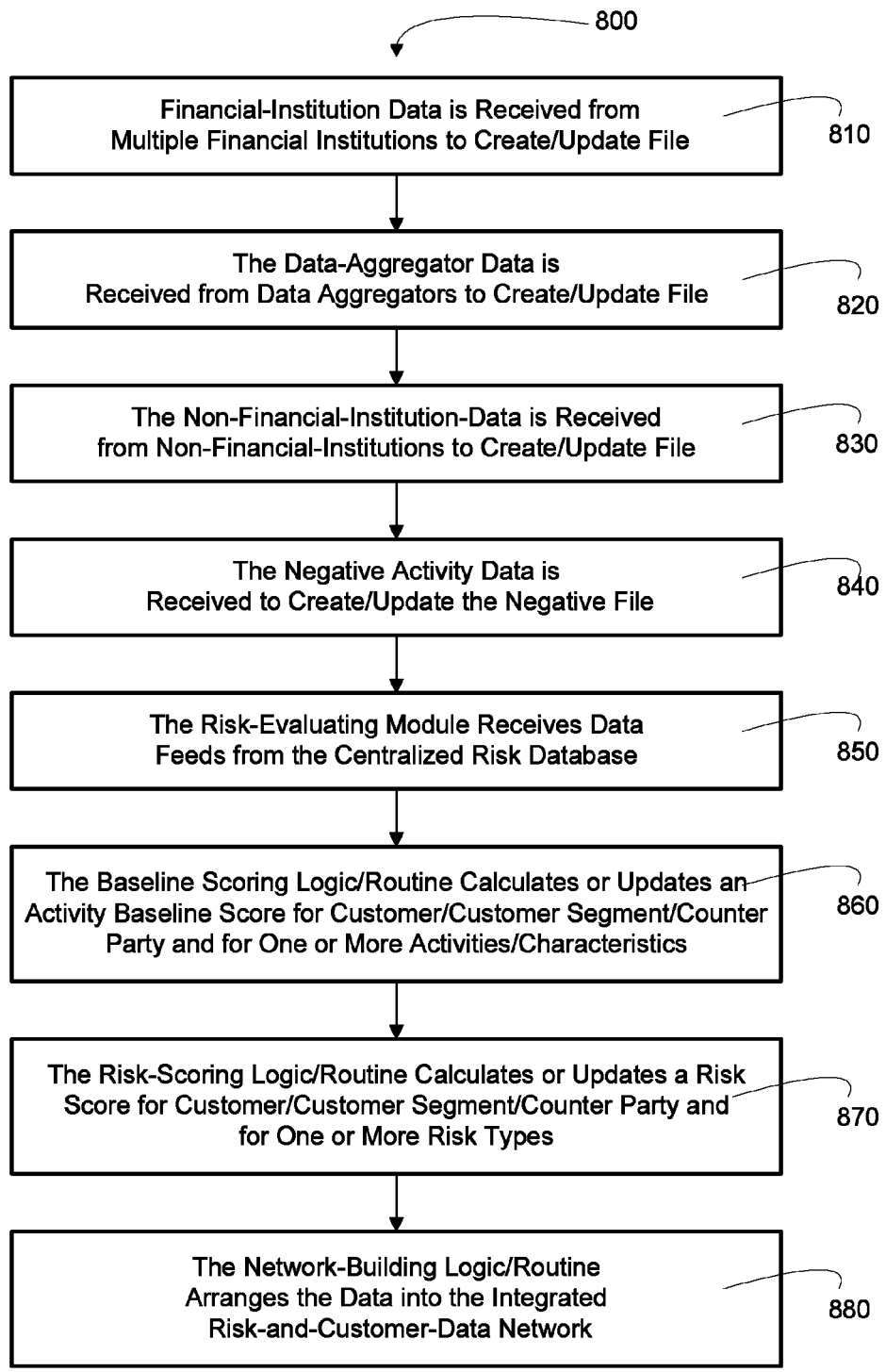
FIG. 7 is a flow diagram of a method for method for creating an integrated-risk-and-customer-data network, in accordance with an embodiment of the present invention.

FIG. 7 is a flow diagram of a method 800 for configuring a risk database and implementing the database in risk evaluations, in accordance with an embodiment of the present invention. At Event 810, the financial institution data 200 is received from multiple financial institutions. As provided above, financial institutions may provide one or more of the following: activity/transaction data 210, product data 220, account data 230, channel data 240, asset & liability data 250, customer data 260, negative file data 270, counterparty data 280 and claims data 290.

At Event 820, data is received in the risk database 100 from one or more third party data aggregators 30. As provided above, the data aggregators may provide any and/or all of the same types of data provided by the financial institutions and/or the non-financial institution entities. At Event 830, non-financial institution data 300 is received from non-financial institutions. As provided above, non-financial institution data may include activity/transaction data 310, product data 320, account data 330, channel data 340, asset and liability data 350, customer data 360, negative file data 370, counterparty data 380 and claims data 390.

At Event 840, negative file data 270 and 370 are received from multiple financial institutions, non-financial institutions, data aggregators and the like to create or update the negative file. As previously noted, the negative file may include names of high risk entities (e.g., fraud perpetrators, etc.), as well as addresses, telephone numbers, social security numbers, tax identification numbers, IP addresses, device identifiers, biometric data that have been associated with high risk individuals or proven to be counterfeit, and the like.

Next, at Event 850, the risk evaluating module 400 receives data feeds from, or otherwise accesses, the risk database that includes data collected from multiple financial institutions, data aggregators, and non-financial institutions. The data may include, but is not limited to, the financial institution data 200 and the non-financial institution data 300. The data 200 and 300 may be downloaded periodically, or on a predetermined schedule, or on an as-needed basis, or the risk evaluating module 400 may be configured to receive real-time feeds of the data 200 and 300.

Next, at Event 860, the activity baseline scoring logic/routine 106 calculates or updates an activity-based activity baseline score for each customer and/or customer segments and/or counterparties and for one or more activities based on the data provided in centralized risk database 100. For example, to determine an activity-based activity baseline score for a customer, the activity baseline scoring logic/routine 106 may filter and/or search the risk database 100 to determine which financial institutions are associated with the customer and then identify the accounts related to the customer within each financial institution. In addition, the activity baseline scoring logic/routine 106 may search the transactional data associated with the identified customer to identify debit patterns, deposit patterns, debit-card-purchase patterns, wire-transfers patterns, cellular telephone calling patterns, internet surfing patterns and the like. The activity baseline scoring logic/routine 106 develops an activity baseline scores for the customers, customer segments and/or counterparties based on the identified patterns.

At Event 870, the risk score logic/routine 108 calculates risk scores for each customer and/or customer segment and/or counterparty based on the data in the centralized risk database 100. According to some embodiments, the risk score logic/routine 108 monitors the customer's data for risk pattern data 34 and then calculates the customer's risk score based, at least in part, on whether any risk pattern data 34 were identified, the mix and frequency of the risk pattern data 34 and the probability of loss associated with each risk pattern data 34 identified.

At Event 880, the network building logic/routine 102 is executed to format and correlate the data 200 and 300, as well as the activity baseline scores and risk scores, and then arranges the data into the integrated risk and customer data network 500 such that the data 200, and 300 and the baseline and risk scores are organized according to customer/customer segment, counterparty or the like. In some embodiments of the invention, integrated risk and customer data can also organize data 200 and 300 and, where appropriate the activity baseline and risk scores, by other defining traits such as product, channel, geography, network and the like.

Figure 8:
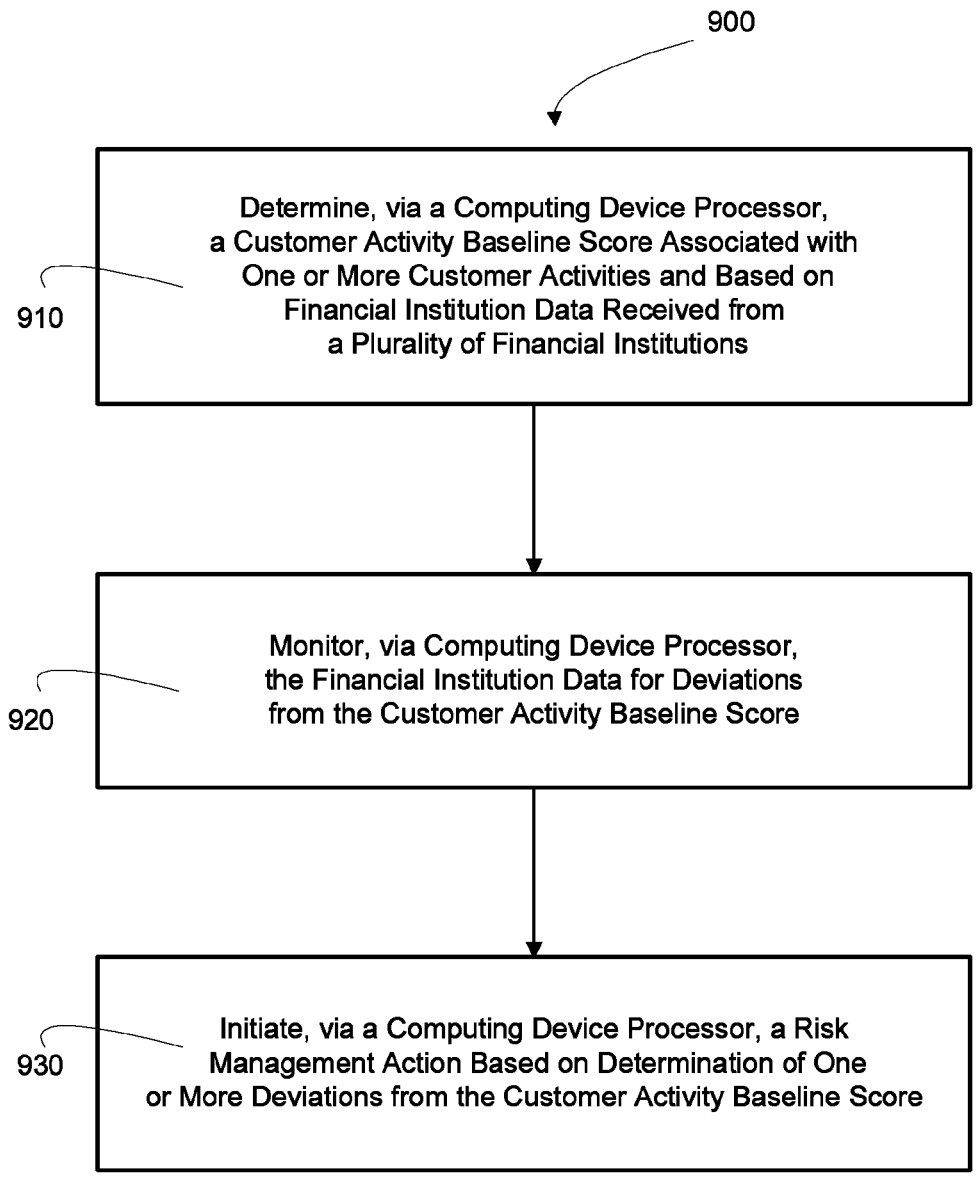
FIG. 8 is a flow diagram of a method for determining a customer activity baseline score, in accordance with embodiments of the present invention.

FIG. 8 provides another flow diagram of a method 900 for risk assessment and management, in accordance with embodiments of the present invention. At Event 910, an activity baseline score is determined. The activity baseline score is associated with one or more customer activities and is based on, at least in part, financial institution data received from a plurality of financial institutions. In alternate embodiments, the activity baseline score is based on non-financial institution data received from one or more non-financial institutions.

In other embodiments, the activity baseline score may be a customer segment baseline score associated with one or more customer segment activities. The customer segment is defined as a plurality of customers having at least one common activity, characteristic, trait or the like. In other embodiments, the activity baseline score may be a counterparty baseline score associated with one or more counterparty activities. The counterparty is defined as the other persons and/or entities (excluding the customer) involved in a transaction or interaction with the customer/client.

In other embodiments, a plurality of customer or customer segment or counterparty activity baseline scores are determined, such that, each activity baseline score is associated with different one or more customer or customer segment activities.

At Event 920, the financial institution data is monitored for deviations from the activity baseline score. In specific embodiments, non-financial institution data may additionally be monitored, in addition to financial institution data, for deviations from the activity baseline score. In further embodiments, in which the activity baseline score is a customer segment baseline score, the financial institution data is monitored for deviations from the customer segment baseline score. In other embodiments, in which a plurality of activity baseline scores are determined, the financial institution data is monitored for deviations from the plurality of customer activity baseline scores.

At Event 930, a risk management action is initiated based on the determination of one or more deviations from the customer activity baseline score. In specific embodiments, the risk management action includes generating and communicating an activity baseline deviation alert based on determination of predetermined deviations, levels of deviations, types of deviation or the like. The predetermined deviations may vary, either positively or negatively, from the baseline score by a predetermined amount that warrants notifying one or more entities, such as the risk assessment and mitigation entity, for example, a financial institution; a business, a government agency or the affected customer(s). In specific embodiments, the predetermined communication entities may be based on a predetermined level of risk score, such that certain entities receive the alert if one level of score is attained and other entities receive the alert if a second level of score is attained and so on.

Figure 9:
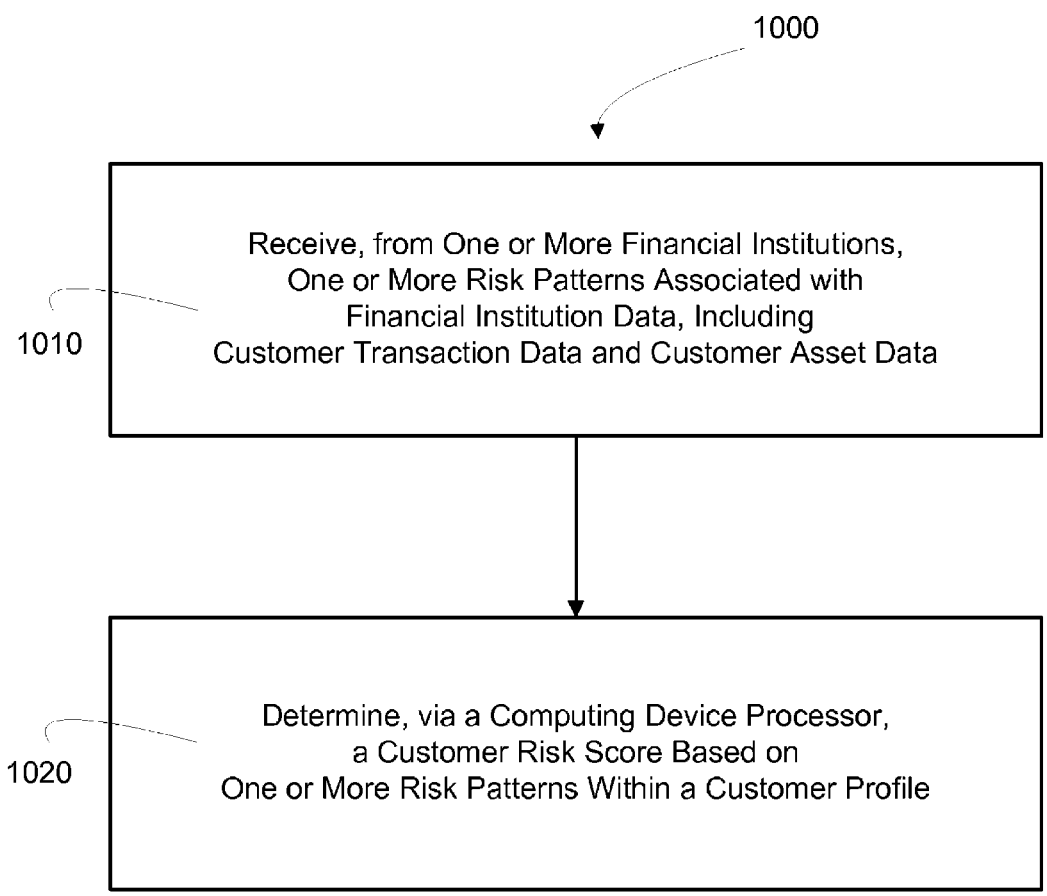
FIG. 9 is a flow diagram of a method for determining a risk score, in accordance with embodiments of the present invention.

Referring to FIG. 9, another flow diagram is presented of a method 1000 for risk management in accordance with an embodiment of the present invention. At Event 1010, one or more risk patterns associated with financial institution data, including at least one of transaction data or asset data, are received. In additional embodiments, negative file data, liability data, counterparty data and/or non-financial institution data may also be received.

At Event 1020, a customer risk score is based on one or more risk patterns. In specific embodiments, the customer risk score may be based upon the occurrence of risk patterns within a customer profile, the quantity of risk patterns, the severity of risk patterns, the frequency of risk patterns, the types of risk patterns and the like. In alternate embodiments, customer segment risk scores and/or counterparty risk scores may be determined based upon risk patterns found in the customer's or counterparty's profile relating to customer data, account data, asset and liability data and/or counterparty data.

Thus, present embodiments herein disclosed provide for determining one or more customer activity baseline scores, each score associated with one or more customer activities and based at least in part on financial institution data from multiple financial institutions. The activity baseline score defines a normal risk or baseline risk for the customer in terms of the activity(ies). Further the invention provides for monitoring at least the financial institution data to determine deviations from the activity baseline score(s). In addition, embodiments of the invention provide for determining risk scores based on the identification of risk patterns within a customer's profile of activities, assets, liabilities and/or networks. In optional embodiments the invention also includes generating and initiating communication of risk score alerts and/or activity baseline deviation alerts based on predetermined activity baseline scores or activity baseline deviations.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. An apparatus for risk management, the apparatus comprising:
   a computing platform including at least one processor and a memory; and
   an activity baseline routine stored in the memory, executable by the processor and configured to
      determine a customer activity baseline score associated with one or more customer activities and based on financial institution data received from a plurality of financial institutions, wherein the customer activity baseline score indicates normal financial activity for a financial institution customer and the financial institution data includes customer transaction data, negative file data, account data and asset and liability data, wherein the normal financial activity of the financial institution customer comprises the financial institution customer's normal transaction locations, normal transaction channels, normal transaction amounts, and/or average deposits maintained;
      determine a customer population activity baseline score associated with one or more population activities, wherein the customer population is defined as a totality of customers;
      determine a counterparty activity baseline score associated with one or more counterparty activities, wherein a counterparty is defined as a person or entity other than the customer involved in a transaction or interaction with one or more customers;
      monitor the financial institution data received from the plurality of financial institutions to determine either a positive deviation or negative deviation from the customer activity baseline score;
      monitor the financial institution data received from the plurality of financial institutions to determine either a positive deviation or negative deviation from the customer population activity baseline score;

monitor the financial institution data received from the plurality of financial institutions to determine either a positive deviation or negative deviation from the counterparty population activity baseline score;

generate and initiate communication of an activity baseline deviation alert based on a determination of the deviation from the customer activity baseline score, wherein the activity baseline deviation alert is communicated to pre-determined entities based on a pre-determined level of deviation, wherein the predetermined entities comprise a first designated entity to which a first alert is communicated based on a first pre-determined level of deviation and a second designated entity to which a second alert is communicated based on a second pre-determined level of deviation, wherein the second pre-determined level of deviation is higher than the first pre-determined level of deviation;

generate and initiate communication of a customer population activity baseline deviation alert based on a determination of the deviation from the customer population activity baseline score; and generate and initiate communication of a counterparty activity baseline deviation alert based on a determination of the deviation from the counterparty activity baseline score.

2. The apparatus of claim 1, wherein the activity baseline routine is further configured to determine a customer segment activity baseline score associated with one or more segment activities, wherein a customer segment is defined as a plurality of customers having at least one common activity or trait.

3. The apparatus of claim 1, wherein the activity baseline deviation routine is configured to monitor for the deviations by analysis of data received in a risk database.

4. The apparatus of claim 1, wherein the activity baseline deviation routine is configured to monitor for the deviations by querying at least one of the plurality of financial institutions.

5. The apparatus of claim 1, wherein the activity baseline deviation routine is configured to monitor for the deviations by querying one or more non-financial institutions.

6. The apparatus of claim 1, wherein the activity baseline routine is further configured to determine the customer activity baseline score based on non-financial institution data received from one or more non-financial institution entities.

7. The apparatus of claim 1, wherein the activity baseline routine is further configured to determine a plurality of customer activity baseline scores, wherein each customer activity baseline score is associated with different one or more customer activities.

8. The apparatus of claim 1, wherein the risk alert routine is further configured to initiate communication of the activity baseline deviation alert to pre-determined entities based on one or more of a pre-determined type of deviation.

9. The apparatus of claim 1, further comprising a third party query routine stored in the memory, executable by the processor and configured to receive third party activity baseline deviation queries, determine whether a customer activity or event is a deviation from the activity baseline score and communicate a query response to the third party.

10. The apparatus of claim 1, further comprising a customer identifying routine stored in the memory, executable by the processor and configured to positively identify the customer from the financial institution data prior to determining the activity baseline score.

11. A method for risk assessment, the method comprising:

determining, via a computing device processor, a customer activity baseline score associated with one or more customer activities and based on financial institution data received from a plurality of financial institutions, wherein the customer activity baseline score indicates normal financial activity for a financial institution customer and the financial institution data includes customer transaction data, negative file data, account data and asset and liability data, wherein the normal financial activity of the financial institution customer comprises the financial institution customer's normal transaction locations, normal transaction channels, normal transaction amounts, and/or average deposits maintained;

determining, via a computing device processor, a customer population activity baseline score associated with one or more population activities, wherein the customer population is defined as a totality of customers;

determining, via a computing device processor, a counterparty activity baseline score associated with one or more counterparty activities, wherein a counterparty is defined as a person or entity other than the customer involved in a transaction or interaction with one or more customers;

monitoring, via a computing device processor, the financial institution data to determine either a positive deviation or a negative deviation from the customer activity baseline score;

monitoring, via a computing device processor, the financial institution data received from the plurality of financial institutions to determine either a positive deviation or negative deviation from the customer population activity baseline score;

monitoring, via a computing device processor, the financial institution data received from the plurality of financial institutions to determine either a positive deviation or negative deviation from the counterparty population activity baseline score;

generating and initiating communication of an activity baseline deviation alert based on a determination of the deviation from the customer activity baseline score, wherein the activity baseline deviation alert is communicated to pre-determined entities based on a pre-determined level of deviation, wherein the predetermined entities comprise a first designated entity to which a first alert is communicated based on a first pre-determined level of deviation and a second designated entity to which a second alert is communicated based on a second pre-determined level of deviation, wherein the second pre-determined level of deviation is higher than the first pre-determined level of deviation;

generating and initiating communication of a customer population activity baseline deviation alert based on a determination of the deviation from the customer population activity baseline score; and generating and initiating communication of a counterparty activity baseline deviation alert based on a determination of the deviation from the counterparty activity baseline score.

12. The method of claim 11, further comprises determining, via a computing device processor, a customer segment activity baseline score associated with one or more segment activities, wherein a customer segment is defined as a plurality of customers having at least one common activity or trait and monitoring, via a computing device processor, the financial institution data for a deviation from the customer segment activity baseline score and initiating, via the computing device processor, a risk management action based on determination of one or more deviations from the customer segment activity baseline score.

13. The method of claim 11, wherein monitoring further comprises analyzing data received in a risk database to determine the deviation from the customer activity baseline score.

14. The method of claim 11, wherein monitoring further comprises querying at least one of the plurality of financial institutions to determine the deviation from the customer activity baseline score.

15. The method of claim 11, wherein monitoring further comprises querying one or more non-financial institution entities to determine the deviation from the customer activity baseline score.

16. The method of claim 11, wherein determining further comprises determining, via a computing device processor, the activity baseline score based on non-financial institution data received from one or more non-financial institution entities.

17. The method of claim 11, wherein determining further comprises determining, via the computing device processor, a plurality of customer activity baseline scores for a customer, wherein each customer activity baseline score is associated with different one or more customer activities.

18. The method of claim 11, wherein generating further comprises generating and initiating communication, via the computing device processor, of the activity baseline deviation alert, wherein the activity baseline deviation alert is communicated to pre-determined entities based on one or more of a pre-determined type of deviation.

19. The method of claim 11, further comprising receiving third party activity baseline deviation queries from a third party and determining whether a customer activity or event associated with the query is a deviation from the activity baseline score and communicating a query response to the third party.

20. The method of claim 11, further comprising identifying a customer from the financial institution data prior to determining the customer's activity baseline score.

21. The method of claim 11, further comprising identifying a customer from non-financial institution data prior to determining the customer's activity baseline score.

22. A non-transitory computer-readable storage medium comprising:
a first set of codes for causing a computer to:
determine a customer activity baseline score associated with one or more customer activities and based on financial institution data received from a plurality of financial institutions, wherein the customer activity baseline score indicates normal financial activity for a financial institution customer and the financial institution data includes customer transaction data, negative file data, account data and asset and liability data, wherein the normal financial activity of the financial institution customer comprises the financial institution customer's normal transaction locations, normal transaction channels, normal transaction amounts, and/or average deposits maintained;
determine a customer population activity baseline score associated with one or more population activities, wherein the customer population is defined as a totality of customers; and
determine a counterparty activity baseline score associated with one or more counterparty activities, wherein a counterparty is defined as a person or entity other than the customer involved in a transaction or interaction with one or more customers;
a second set of codes for causing a computer to:
monitor the financial institution data to determine either a positive deviation or negative deviation from the customer activity baseline score;
monitor the financial institution data received from the plurality of financial institutions to determine either a positive deviation or negative deviation from the customer population activity baseline score; and
monitor the financial institution data received from the plurality of financial institutions to determine either a positive deviation or negative deviation from the counterparty population activity baseline score; and
a third set of codes for causing a computer to:
generate and initiate communication of an activity baseline deviation alert based on a determination of the deviation from the customer activity baseline score, wherein the activity baseline deviation alert is communicated to pre-determined entities based on a pre-determined level of deviation, wherein the predetermined entities comprise a first designated entity to which a first alert is communicated based on a first pre-determined level of deviation and a second designated entity to which a second alert is communicated based on a second pre-determined level of deviation, wherein the second pre-determined level of deviation is higher than the first pre-determined level of deviation;
generate and initiate communication of a customer population activity baseline deviation alert based on a determination of the deviation from the customer population activity baseline score; and
generate and initiate communication of a counterparty activity baseline deviation alert based on a determination of the deviation from the counterparty activity baseline score.

23. The computer program product of claim 22, wherein the first set of codes is further configured to cause the computer to determine a customer segment activity baseline score associated with one or more segment activities, wherein a customer segment is defined as a plurality of customers having at least one common activity or trait, wherein the second set of codes is further configured to cause the computer to monitor the financial institution data for a deviation from the customer segment activity baseline score and wherein the third set of codes is further configured to cause the computer to initiate a risk management action based on determination of one or more deviations from the customer segment activity baseline score.

24. The computer program product of claim 22, wherein the second set of codes is further configured to cause the computer to analyze data received in a risk database to determine the deviation from the customer activity baseline score.

25. The computer program product of claim 22, wherein the second set of codes is further configured to cause the computer to query at least one of the plurality of financial institutions to determine the deviation from the customer activity baseline score.

26. The computer program product of claim 22, wherein the second set of codes is further configured to cause the computer to query one or more non-financial institution entities to determine the deviation from the customer activity baseline score.

27. The computer program product of claim 22, wherein the first set of codes is further configured to cause the computer to determine the activity baseline score based on non-financial institution data received from one or more non-financial institution entities.

28. The computer program product of claim 22, wherein the first set of codes is further configured to cause the computer to determine a plurality of customer activity baseline scores for a customer, wherein each customer activity baseline score is associated with different one or more customer activities.

29. The computer program product of claim 22, wherein the third set of codes is further configured to cause the computer to generate and initiate communication, via the computing device processor, of the activity baseline deviation alert, wherein the activity baseline deviation alert is communicated to pre-determined entities based on one or more of a pre-determined type of deviation.

30. The computer program product of claim 22, further comprising a fourth set of codes for causing a computer to receive third party activity baseline deviation queries from a third party and a fifth set of codes for causing a computer to determine whether a customer activity or event associated with the query is a deviation from the activity baseline score and a sixth set of codes for causing a computer to communicate a query response to the third party.

31. The computer program product of claim 22, further comprising a fourth set of codes for causing a computer to identify a customer from the financial institution data prior to determining the customer's activity baseline score.

* * * * *